US011816717B2

(12) United States Patent
Oh et al.

(10) Patent No.: US 11,816,717 B2
(45) Date of Patent: Nov. 14, 2023

(54) WEARABLE DEVICE FOR PROVIDING PAYMENT INFORMATION

(71) Applicant: SK Planet Co., Ltd., Seongnam-si (KR)

(72) Inventors: Sungoh Oh, Seoul (KR); Kwonho Lee, Gyeonggi-do (KR); Sunghyun Yoon, Seoul (KR)

(73) Assignee: SK Planet Co., Ltd., Seongnam-si (KR)

(*) Notice: Subject to any disclaimer, the term of this patent is extended or adjusted under 35 U.S.C. 154(b) by 144 days.

(21) Appl. No.: 17/147,350

(22) Filed: Jan. 12, 2021

(65) Prior Publication Data

US 2021/0133844 A1    May 6, 2021

Related U.S. Application Data

(63) Continuation of application No. 15/331,474, filed on Oct. 21, 2016, now Pat. No. 10,922,733.

(30) Foreign Application Priority Data

Oct. 26, 2015 (KR) .................. 10-2015-0148975
Oct. 28, 2015 (KR) .................. 10-2015-0150318
Oct. 29, 2015 (KR) .................. 10-2015-0150981

(51) Int. Cl.
G06Q 30/00    (2023.01)
G06Q 30/0601  (2023.01)
(Continued)

(52) U.S. Cl.
CPC ......... G06Q 30/0623 (2013.01); G06F 3/013 (2013.01); G06F 3/017 (2013.01);
(Continued)

(58) Field of Classification Search
USPC ...................................... 705/26.61
See application file for complete search history.

(56) References Cited

U.S. PATENT DOCUMENTS 9,897,808 B2    2/2018  Yoo
2011/0140380 A1* 6/2011  Ulrich ............... G06Q 30/0603
                                          280/33.992

(Continued)

FOREIGN PATENT DOCUMENTS

KR    10-2011-0068116 A    6/2011
KR    10-2012-0001285 A    1/2012
(Continued)

OTHER PUBLICATIONS

Klabjan, D., Pei, J., In-store one-to-one marketing, Jan. 2011, Journal of Retailing and Consumer Services, vol. 18, Issue 1, pp. 64-73. (Year: 2011).*

(Continued)

Primary Examiner — Jeffrey A. Smith
Assistant Examiner — Brittany E Bargeon
(74) Attorney, Agent, or Firm — WTA Patents

(57) ABSTRACT

The present invention relates to a payment information providing system using a wearable device, and more specifically, the payment information providing system includes: a wearable device for recognizing and photographing a product image by sensing a motion of a user and transferring the photographed product image to a product information providing device, and receiving product information transferred from the product information providing device and displaying the product information on a screen; the product information providing device for receiving the product image from the wearable device and providing information on a product related to the product image to the wearable device; and a contents providing server for receiving the product information from the product information (Continued)

providing device and transferring digital contents to the wearable device if a product to be purchased is selected according to the received product information.

10 Claims, 26 Drawing Sheets

(51) Int. Cl.
  *G06Q 30/0207* (2023.01)
  *G06F 3/01* (2006.01)
  *G06Q 20/38* (2012.01)
  *G06Q 20/32* (2012.01)
  *G02B 27/01* (2006.01)

(52) U.S. Cl.
  CPC ....... *G06Q 20/3276* (2013.01); *G06Q 20/387* (2013.01); *G06Q 30/0207* (2013.01); *G02B 27/0172* (2013.01); *G02B 2027/014* (2013.01); *G02B 2027/0138* (2013.01); *G02B 2027/0141* (2013.01); *G02B 2027/0178* (2013.01)

(56) References Cited

U.S. PATENT DOCUMENTS

| | | | |
|---|---|---|---|
| 2011/0145093 A1 | 6/2011 | Paradise et al. | |
| 2011/0246328 A1 | 10/2011 | Dunwoody et al. | |
| 2012/0226586 A1 | 9/2012 | Paul | |
| 2013/0143603 A1 | 6/2013 | DiAcetis et al. | |
| 2013/0179303 A1 | 7/2013 | Petrou et al. | |
| 2013/0191789 A1* | 7/2013 | Calman | G06F 3/017 715/863 |
| 2013/0297460 A1* | 11/2013 | Spivack | G06Q 30/0643 705/27.2 |
| 2014/0156459 A1 | 6/2014 | Zises | |
| 2014/0207615 A1 | 7/2014 | Li et al. | |
| 2014/0214618 A1 | 7/2014 | Pedley et al. | |
| 2014/0354688 A1 | 12/2014 | Min et al. | |
| 2015/0220922 A1* | 8/2015 | Elangovan | G06Q 20/40 705/44 |
| 2015/0242922 A1* | 8/2015 | Zamer | G06Q 30/0623 705/26.61 |
| 2015/0254737 A1 | 9/2015 | Shin et al. | |
| 2015/0302500 A1 | 10/2015 | Koch et al. | |
| 2015/0309535 A1* | 10/2015 | Connor | A61B 5/1477 361/679.03 |
| 2015/0363856 A1 | 12/2015 | Rinicella et al. | |
| 2016/0011421 A1 | 1/2016 | Kim et al. | |
| 2016/0110727 A1 | 4/2016 | Prasad et al. | |
| 2016/0110791 A1* | 4/2016 | Herring | G06Q 20/18 705/26.61 |
| 2016/0148292 A1 | 5/2016 | Gupta et al. | |
| 2016/0162908 A1 | 6/2016 | Marum et al. | |
| 2016/0180426 A1 | 6/2016 | Thakur | |
| 2016/0189268 A1 | 6/2016 | Gandhi | |
| 2016/0364758 A1* | 12/2016 | Achhra | H04W 4/02 |

FOREIGN PATENT DOCUMENTS

| | | | |
|---|---|---|---|
| KR | 10-2014-0043647 A | | 4/2014 |
| KR | 10-1467529 B1 | | 12/2014 |
| KR | 10-2015-0003591 A | | 1/2015 |
| KR | 10-2015-0029453 A | | 3/2015 |
| KR | 10-2015-0055498 A | | 5/2015 |
| KR | 10-2015-0088965 A | | 8/2015 |
| KR | 10-2015-0105795 A | | 9/2015 |

OTHER PUBLICATIONS

Badju, A. et al., "Shopping Using Gesture-Driven Interaction," May 2015, Lund University Department of Design Sciences, pp. 28-39.
United States Office Action, U.S. Appl. No. 15/331,474, filed Jul. 2, 2020, 14 pages.
United States Office Action, U.S. Appl. No. 15/331,474, filed Mar. 3, 2020, 17 pages.
United States Office Action, U.S. Appl. No. 15/331,474, filed Oct. 3, 2019, 15 pages.
United States Office Action, U.S. Appl. No. 15/331,474, filed May 13, 2019, 12 pages.
United States Office Action, U.S. Appl. No. 15/331,474, filed Jan. 17, 2019, 12 pages.

\* cited by examiner

[Confirm eyeline of user through smart glass]

Confirm where eyes of user wearing smart glass stays

WEARABLE DEVICE FOR PROVIDING PAYMENT INFORMATION

CROSS REFERENCE TO RELATED APPLICATIONS

The present application is continuation of U.S. patent application Ser. No. 15/331,474 filed on Oct. 21, 2016, which claims the benefit of Korean Patent Application No. 10-2015-0148975 filed in the Korean Intellectual Property Office on Oct. 26, 2015, Korean Patent Application No. 10-2015-0150318 filed in the Korean Intellectual Property Office on Oct. 28, 2015 and Korean Patent Application No. 10-2015-0150981 filed in the Korean Intellectual Property Office on Oct. 29, 2015, the entire contents of which are incorporated herein by reference.

BACKGROUND OF THE INVENTION

Field of the Invention

The present invention relates to a payment information providing system using a wearable device and a payment information providing method using the same, and more specifically, to a technique of recognizing a product on a display stand using a wearable device such as a smart glass, creating product information corresponding to an image of the recognized product, and providing a related contents service.

Background of the Related Art

A wearable device is literally a device that can be put on a human body, and there are various kinds of wearable devices according to wearing portions, such as glasses, a watch, shoes, a ring, a belt, a band, a necklace, a headset, clothes and the like. Such wearable devices are currently in a rapidly distributed stage, and among them, wearable glasses, wearable watches and wearable bands closely related to human life and, at the same time, easy to wear form largest product groups.

On the other hand, the wearable device is also referred to as a smart device in other words. It is since that although initiation of operation by an input of a user is needed, if once the operation is initiated, various kinds of additional information can be automatically created and provided to the user thereafter. For example, if a user wearing a wearable watch desires to measure his or her heart rate, the wearable watch measures the heart rate of the user as soon as the user presses a heart rate measurement input button and creates and provides various kinds of information to the user based on the measured heart rate. Meanwhile, a lot of wearable devices which do not need initiation of operation by an input of a user also appear recently. For example, a wearable band may continuously measure a heart rate of a user although there is no initiation of operation by an input of a user, and it is highly probable that wearable devices of the future will be developed in a direction that does not need initiation of operation by an input of a user. It is since that convenience of operating a device will be increased as the input of a user is not needed.

The source of various kinds of additional information provided by the wearable device to a user is information measured from the user. For example, it is information such as a heartbeat rate, a blood pressure, a mental state, a weight, a body temperature, a respiration volume, the number of steps, interest, a current position and the like of the user. Accordingly, the wearable device should necessarily install sensors for measuring a variety of information from the user, and the more the kinds of installed sensors, the more information can be measured from the user. Accordingly, recent wearable devices tend to necessarily install a heart rate measurement sensor, a global positioning system (GPS) sensor and a step count measurement sensor, and studies on installing various kinds of sensors in the limited inner space of a device are progressed continuously.

After measuring such information from the user through the installed sensors, the wearable device may create various kinds of additional information based on the information and provide the user with the information. For example, the wearable device may measure blood pressure of a user and provide, if the blood pressure is too high, information on medicines which can drop the blood pressure to an appropriate level or may measure the current position of the user and provide information on nearby stores or products related to the interest of the user. Although the additional information can be provided through a function of the wearable device itself, since all the additional information needed for different users cannot be provided through one wearable device, applications installed in the wearable device are developed together recently. Here, an application can be regarded as a kind of application program and may perform a function of creating and providing various kinds of additional information based on the information measured through a function of the wearable device itself.

In the above example, all the information on medicines which can drop the blood pressure to an appropriate level and information on the nearby stores or products related to the interest of the user can be provided by the application. That is, whenever a new application is developed, additional information that can be provided to the user through the wearable device is necessarily diversified, and thus development of applications can be regarded as a companion to go forward together with development of the wearable device itself.

Meanwhile, construction of a system capable of providing digital contents or making a payment through a wearable device emerges as a main issue in the related industries recently.

For example, although a user does not take out his or her wallet and make a payment, the user may make a payment using digital contents presented through a wearable device by installing a near field communication (NFC) function in the wearable device itself and registering a credit card and authentication information of the user in an application. That is, the wearable device may perform a mobile wallet function on behalf of the conventional wallets.

Meanwhile, a general service system for providing product information and payment information related to the product information using a smart phone is constructed already.

However, when the product information and the payment information are created in a conventional system, there is a problem in that users cannot use the system properly since the speed and convenience are insufficient to immediately recognize the products displayed in a store and perform a service for providing payment information associated with digital contents in real-time.

Accordingly, a system and a method utilizing the same are proposed in this specification, which can solve the problem of speed and convenience by way of a service of providing payment information through a wearable device and, at the same time, provide users with further efficient services in association with digital contents providing service.

SUMMARY OF THE INVENTION

Therefore, the present invention has been made in view of the above problems, and it is an object of the present invention to provide a service for providing product information and payment information in real-time by immediately recognizing a product image.

Another object of the present invention is to provide a service associated with digital contents in real-time by using product information corresponding to a product image.

Accordingly, proposed in this specification is a service capable of solving the problem of convenience and security of payment in making a payment through a wearable device and, at the same time, receiving information on coupons, points or events that can be used at a store where a user is going to make a payment from a product information providing device by recognizing, without a physical input, a motion of the user for making a payment.

An object of the present invention is to receive information on coupons, points or events that can be used can be used at a store where a user is going to make a payment without a physical input, by sensing a payment motion of the user.

An object of the present invention is to provide a system and method for providing benefit information for an interested product, which can collect information on a product reviewed by a user with interest, as well as a product actually purchased by the user, and actually provide the user with information on the interested product based on the collected information.

Another object of the present invention is to provide a system and method for providing benefit information for an interested product, which can register the interested product on the basis of exposure time of an object identified by an image acquired through a wearable device.

Still another object of the present invention is to provide a system and method for providing benefit information for an interested product, which can recommend benefit information of the products belonging to a category of a product registered as an interested product.

Another object of the present invention is to provide a custom-tailored product to the user by inversely using the information collected using the wearable device and provide a digital contents service associated with the product. Meanwhile, the technical problems to be solved by the present invention are not limited to those mentioned above, and diverse technical problems may be included within the scope clearly understood by those skilled in the art from the following descriptions.

To accomplish the above objects, according to one aspect of the present invention, there is provided a payment information providing system using a wearable device, the system including: the wearable device for recognizing and photographing a product image by sensing a motion of a user and transferring the photographed product image to a product information providing device, and receiving product information transferred from the product information providing device and displaying the product information on a screen; the product information providing device for receiving the product image from the wearable device and providing information on a product related to the product image to the wearable device; and a contents providing server for receiving the product information from the product information providing device and transferring digital contents to the wearable device if a product to be purchased is selected according to the received product information.

Meanwhile, the payment information providing system may further include a membership connection device for performing authentication according to authentication information transferred from the contents providing server, transferring membership information of the user to the contents providing server if it is confirmed that the user is a membership holder as a result of the authentication, and transmitting a membership acquisition request message to the contents providing server and the wearable device if it is confirmed that the user is not a membership holder.

A wearable device of the present invention includes: a motion sensing unit for sensing a motion of a user; a camera module for recognizing and photographing a product image; an image storage unit for storing a product image data of the product image photographed by the camera module; an image data transmission unit for transferring the product image data stored in the image storage unit to a product information providing device; a product information data reception unit for receiving product information transferred from the product information providing device; and a display unit for displaying the product information data received by the product information data reception unit on a screen.

Meanwhile, the product information data reception unit may further receive digital contents transferred from a contents providing server if a product to be purchased is selected according to the product information, and the display unit may display payment information of the product reflecting the digital contents received by the product information data reception unit on a screen.

At this point, the motion of the user sensed by the motion sensing unit may be an eyeline of the user gazing at a product or a preset gesture performed on the product that the user is gazing at.

At this point, if the motion of the user sensed by the motion sensing unit matches a preset motion, the camera module may recognize and photograph the product.

A product information providing device of the present invention includes: a data reception unit for receiving a digital contents information data or a product image data; a product image database for storing image data of products displayed in a store; a product image matching unit for determining whether or not the product image data received from a wearable device by the data reception unit matches a product image data previously stored in the product image database; a product information providing module for providing information on a matching product if it is determined by the product image matching unit that the product image data of a store stored in the product image database matches the product image data received from a wearable device; and a product information data transmission unit for transferring product information data provided by the product information providing module to the wearable device.

Meanwhile, the product information data transmission unit may further transfer the product information data provided by the product information providing module to a contents providing server.

The product information providing module of the present invention includes: a product classification unit for classifying, by category, a type of a product corresponding to the product image data determined as being matched by the product image matching unit; a product information creation unit for creating a product information data of the product classified by category by the product classification unit; and a product data providing unit for transferring the product information data of the product created by the product information creation unit to the product information data transmission unit.

At this point, the product information data of the product created by the product information creation unit may include at least any one of information on a specification of the product, price information, a manufacturing date, a manufacturer and a product provided as a bundle.

At this point, the product information creation unit may additionally create a product information data for a product of the same kind as the product classified by the product classification unit.

At this point, the product information creation unit may create the product information data by reflecting the digital contents information data transferred from the contents providing server.

The contents providing server of the present invention includes: a product information reception unit 310 for receiving product information from the product information providing device; a digital contents providing unit for transferring digital contents related to the product information received by the product information reception unit 310 to a digital contents transmission unit; and the digital contents transmission unit for transferring the digital contents transferred from the digital contents providing unit to the wearable device.

Meanwhile, the contents providing server of the present invention may further include an authentication information transmission unit for transferring authentication information to the membership connection device to confirm whether or not a user holds membership of an affiliated company or a product service provider related to the digital contents transferred from the digital contents providing unit to the wearable device.

The membership connection device of the present invention includes: a membership holder authentication performing unit for performing authentication according to the authentication information transferred from the contents providing server; a membership information transmission unit for transferring membership information of the user to the contents providing server if it is confirmed that the user is a membership holder as a result of the authentication of the membership holder authentication performing unit; a membership acquisition request transmission unit for transmitting a membership acquisition request message to the wearable device if it is confirmed that the user is not a membership holder as a result of the authentication of the membership holder authentication performing unit; and a membership acquisition approval message reception unit for receiving a membership acquisition approval message transmitted from the wearable device in response to the membership acquisition request message.

A method of providing payment information by a payment information providing system includes the steps of: (1) recognizing and photographing, by a wearable device, a product image by sensing a motion of a user; (2) receiving, by a product information providing device, the product image photographed at step (1) and determining whether or not the product image matches a product image data previously stored in a product image database; (3) providing an information data of a matching product if the product image data is matched at step (2); and (4) receiving, by a contents providing server, the product information from the product information providing device and transferring digital contents to the wearable device according to the received product information.

Meanwhile, the method of providing payment information by a payment information providing system may further include, after step (3) and before step (4), the steps of: (a) confirming, by a membership connection device, whether or not a user holds membership of an affiliated company which provides digital contents using authentication information of the service user subscribing a payment information providing service; (b) transferring, by a membership connection device, membership information of the user to the contents providing server if it is confirmed that the user is a membership holder at step (a), and transferring a membership acquisition request message to the contents providing server and the wearable device if it is confirmed that the user is not a membership holder at step (a); and (c) transferring the membership information of the user to the contents providing server if a membership acquisition approval message is transferred from the wearable device in response to the membership acquisition request message transferred at step (b).

A method of providing payment information by a wearable device includes: (1) a motion sensing step of sensing a motion of a user; (2) a step of recognizing and photographing a product image according to the motion recognized at step (1); (3) an image storage step of storing a product image data of the product image photographed at step (2); (4) an information transmission step of transferring the product image data stored at step (3) to a product information providing device; (5) a data reception step of receiving product information corresponding to the product image data transferred at step (4); and (6) a display step of displaying the product information data received at step (5).

A method of providing payment information by a product information providing device includes the steps of: (1) a data reception step of receiving a digital contents information data and a product image data; (2) a step of determining whether or not a product image data of a visited store previously stored in a product image database matches the product image data received at step (1); (3) a product information providing step of providing, if it is determined at step (2) that the product image data of a store stored in the product image database matches the product image data received from a wearable device, an information data of a matching product; and (4) a data transmission step of transferring the product information data provided at step (3) to the wearable device.

At this point, step (3) may include: (a) a product classification step of classifying, by category, a type of a product corresponding to the product image data determined as being matched at step (2); (b) a product information creation step of creating a product information data of the product classified by category at step (a); and (c) a product data providing step of transferring the information data of the product created at step (b) to a product information data transmission unit.

A method of providing payment information by a contents providing server includes: (1) a product information reception step of receiving product information from a product information providing device; (2) a digital contents providing step of transferring digital contents related to the product information received at step (1) to a digital contents transmission unit; and (3) a digital contents transmission step of transferring the digital contents transferred at step (2) to a wearable device.

Meanwhile, the method of providing payment information by a contents providing server may further include, after step (2) and before step (3), an authentication information transmission step of transferring authentication information to a membership connection device 400 to confirm whether or not a user holds membership of an affiliated company or a payment information provider related to the digital contents.

A method of providing payment information by a membership connection device includes: (1) a membership holder authentication performing step of performing authentication according to authentication information transferred from a contents providing server; (2) a step of transferring membership information of a user to the contents providing server if it is confirmed that the user is a membership holder as a result of the authentication at step (1) and transmitting a membership acquisition request message to a wearable device if it is confirmed that the user is not a membership holder; and (3) a membership acquisition approval message receiving step of receiving a membership acquisition approval message transmitted from the wearable device in response to the membership acquisition request message transmitted at step (2).

Meanwhile, 'a system and method for providing payment information using a wearable device' described above may be implemented in the form of a program and recorded in a recording medium that can be read by an electronic device or distributed through a program download management device (a server or the like).

A system for providing coupons and points by sensing a payment motion according to the present invention may include: a wearable device for storing one or more payment motions of a user, sensing a motion of the user, grasping whether or not the sensed motion of the user matches the stored payment motion, and requesting information on coupons, points or events that can be used at a store where the user is positioned from a product information providing device if the motions are matched; and a product information providing device for storing the information on coupons, points or events that can be used at a store, extracting information on coupons, points or events that can be used at a store where the user is positioned, and transmitting the extracted information to the wearable device in response to a request from the wearable device.

In addition, the system of the present invention for providing coupons and points by sensing a payment motion may further include a beacon for sensing approach of the wearable device and transmitting position information of a store to the wearable device approached within a predetermined distance, and the wearable device transmits the position information of the store received from the beacon to the product information providing device and receives information on coupons, points or events that can be used at the sore from the product information providing device.

In addition, the system of the present invention for providing coupons and points by sensing a payment motion may further include a user terminal for receiving information on coupons, points or events from the product information providing device and making a mobile payment by reflecting the information on coupons, points or events.

A wearable device for providing coupons and points by sensing a payment motion according to the present invention may include: a motion storage unit for storing one or more payment motions of a user; a motion sensing unit for sensing a motion of the user; and a control unit for grasping whether or not the sensed motion of the user matches the stored payment motion and, if the motions are matched, requesting information on coupons, points or events that can be used at a store where the user is positioned from a product information providing device.

In addition, the motion sensing unit may use an electromyography sensor for sensing an electrical signal of a muscle changing according to a motion of the user.

In addition, the motion sensing unit may use an inertial sensor for sensing an acceleration changing according to a motion of the user.

At this point, the motion sensing unit senses a motion of the user holding a card or bills, and the control unit creates a payment signal according to the sensed motion.

In addition, the wearable device of the present invention for providing coupons and points by sensing a payment motion may further include a communication unit for transmitting a signal created by the control unit to the product information providing device together with GPS information and receiving information on coupons, points or events of the store based on the GPS information from the product information providing device.

At this point, the communication unit receives position information of the store from a beacon, transmits the position information of the store received from the beacon to the product information providing device, and receives information on coupons, points or events that can be used at the store from the product information providing device.

In addition, the control unit grasps whether or not the motion of the user sensed by the motion sensing unit matches the payment motion, and if the motions are matched, the control unit makes a payment by transmitting payment information of the user reflecting the received information on coupons, points or events to an external device.

A product information providing device of the present invention may include: a database for storing information on coupons, points or events that can be used at a store; a server control unit for extracting information corresponding to a signal received from a wearable device from the database; and a server communication unit for transmitting the corresponding information to the wearable device or a user terminal.

A method of making a payment by sensing a motion according to the present invention includes the steps of: (a) sensing, by a wearable device, a motion of a user; (b) comparing, by the wearable device, the motion of the user with a previously stored motion and creating a signal set to execute a command corresponding to a previously stored payment motion; (c) transmitting, by the wearable device, the signal to a product information providing device and receiving, by a management server, the signal; (d) extracting, by the product information providing device, information corresponding to the received signal; (e) transmitting, by the product information providing device, the extracted information to the wearable device and receiving, by the wearable device, the extracted information; and (f) making a payment, by the wearable device, by transmitting payment information of the user reflecting the received information to an external device.

In addition, the method of making a payment by sensing a motion according to another embodiment of the present invention may further include, before step (c), the step of receiving, by the wearable device, position information of the store from the beacon, and at step (c), the received position information of the store is also transmitted to the product information providing device.

In addition, the method of making a payment by sensing a motion may further include, after step (d), the steps of: (d1) transmitting, by the management server, the extracted information to a user terminal and receiving, by the user terminal, the information; and (d2) making, by the user terminal, a payment by transmitting the payment information of the user reflecting the received information to an external device.

In a method of making a payment by sensing a motion by a wearable device of the present invention, the method of making a payment by sensing a motion includes the steps of: (a) storing one or more payment motions of a user; (b) sensing a motion of the user; (c) grasping whether or not the sensed motion of the user matches the stored payment motion; and (d) requesting, if the sensed motion of the user matches the stored payment motion, information on coupons, points or events that can be used at a store where the user is positioned from a product information providing device.

In addition, step (d) may include the steps of: (d1) transmitting, if the sensed motion of the user matches the stored payment motion, the created payment signal to the product information providing device together with GPS information; and (d2) receiving information on coupons, points or events based on the GPS information from the product information providing device.

In addition, the method of making a payment by sensing a motion may further include the step of: (e) receiving position information of the store from a beacon, and step (d) may include the steps of: (d3) transmitting the position information of the store to the product information providing device; and (d4) receiving information on coupons, points or events that can be used at the store from the product information providing device.

Meanwhile, at step (b), the wearable device may use an electromyography sensor for sensing an electrical signal of a muscle changing according to a motion of the user.

In addition, at step (b), the wearable device may use an inertial sensor for sensing an acceleration changing according to a motion of the user.

In a method of making a payment by sensing a motion by a product information providing device of the present invention, the method of making a payment by sensing a motion may include the steps of: (a) storing information on coupons, points or events that can be used at a store; (b) extracting information corresponding to a signal received from a wearable device; and (c) transmitting the corresponding information to the wearable device or a user terminal.

According to an aspect of the present invention, there is provided a wearable device including: an image acquisition unit for acquiring an image; a display unit for displaying the acquired image; a motion sensing unit for sensing a motion of a user; and a control unit for identifying, if the sensed motion of the user is a preset motion, an object from the displayed image, registering the identified object as an interested product, and receiving benefit information corresponding to a category where the interested product belongs to.

The control unit may measure an exposure time of the object displayed on the display unit and register the object as an interested product if the measured exposure time is longer than a preset time.

In addition, the control unit may extract product identification information by scanning the object, transmit the product identification information to a product information providing device, and receive benefit information corresponding to a category where the product identification information belongs to from the product information providing device.

In addition, the control unit may transmit an image of the object to the product information providing device and receive benefit information corresponding to a category where the image of the object belongs to from the product information providing device.

The motion sensing unit may sense the eyeline of the user gazing at an object or movement of a body performed on the object that the user is gazing at as a motion of the user.

According to another aspect of the present invention, there is provided a product information providing device including: a communication unit for communicating with a wearable device through a communication network; and a personalized service unit for providing, if interested product information is received from the wearable device through the communication unit, the wearable device with benefit information of the products belonging to the category of a corresponding product.

If interested product information including an exposure time and product identification information is received from the wearable device, the personalized service unit may confirm a category where the product identification information belongs to and provide the wearable device with benefit information of the products belonging to the confirmed category.

In addition, if interested product information including an exposure time and product identification information is received from the wearable device, the personalized service unit may extract the product identification information by analyzing the object image, confirm a category where the product identification information belongs to, and provide the wearable device with benefit information of the products belonging to the confirmed category.

The product information providing device may further include a database for storing information on the products by category.

According to still another aspect of the present invention, in a method of providing benefit information for an interested product by a wearable device, there is provided a method of providing benefit information for an interested product, the method including the steps of: (a) recognizing an image corresponding to a view of a user and sensing a motion of the user; (b) identifying an object from the recognized image if the sensed motion of the user is a preset motion; and (c) registering the identified object as an interested product and receiving benefit information corresponding to a category where the interested product belongs to.

Step (c) may include the steps of: measuring an exposure time of the object; extracting product identification information by scanning the object if the measured exposure time is longer than a preset time; determining a category of an interested product corresponding to the product identification information; and receiving benefit information corresponding to the determined category.

Meanwhile, the 'method of providing benefit information for an interested product' may be implemented in the form of a program and recorded in a recording medium that can be read by an electronic device or distributed through a program download management device (a server or the like).

DESCRIPTION OF SYMBOLS

Figure 1:
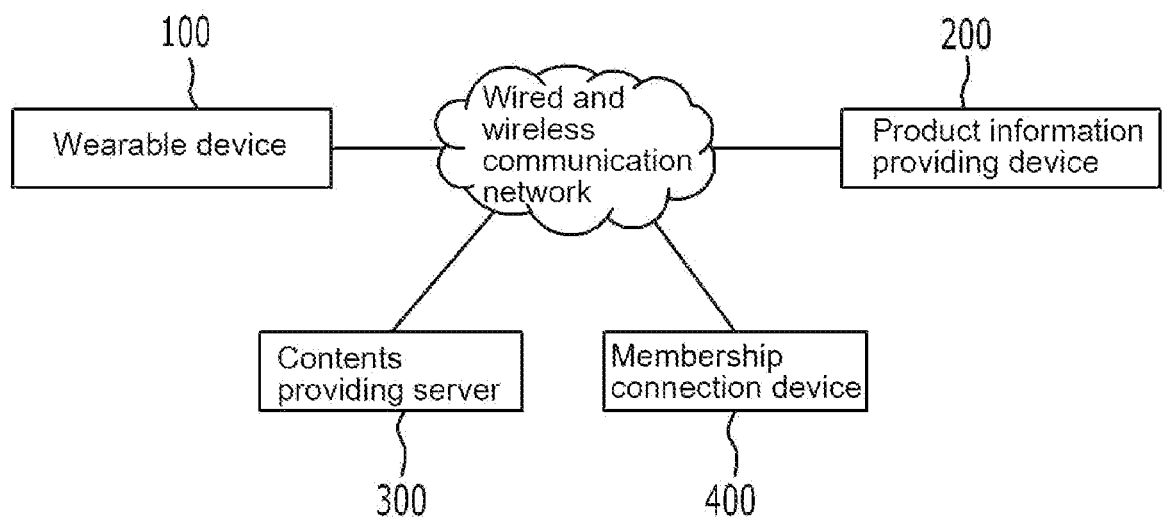
FIG. 1 is a view schematically showing a payment information providing system using a wearable device according to an embodiment of the present invention.

100: Wearable device
110: Motion sensing unit
120: Camera module
130: Image data transmission unit
140: Product information data reception unit
150: Display unit
200: Product information providing device
210: Data reception unit
220: Product image database
230: Product image matching unit
240: Product information providing module
241: Product classification unit
242: Product information creation unit
100': Smart device
110': Camera unit
120': Identification information extraction unit
130': Communication unit
140': Display unit
150': Biometric information measurement unit
160': Input unit
200': Management device
210': Database
220': Identification information matching unit
230': Food recommendation unit
240': Management device communication unit
300': User device
100": Wearable device
110": Image acquisition unit
120": Motion sensing unit
130", 240': Control unit
140": Display unit
150": Storage unit
160", 220": Communication unit
200": Product information providing device
210": Database
230": Personalized service unit

DETAILED DESCRIPTION OF THE PREFERRED EMBODIMENT

Hereinafter, 'a payment information providing system using a wearable device 100 and a service providing method using the same' according to the present invention will be described in detail with reference to the accompanying drawings. The disclosed embodiments are provided to enable those skilled in the art to easily understand the scope of the present invention, and the present invention is not limited by such embodiments. Moreover, matters illustrated in the drawings are schematized in order to describe or explain the embodiments of the present invention more easily and hence may be different from actually embodied forms.

Meanwhile, the constitutional components expressed below are merely examples for implementing the present invention. Accordingly, other constitutional components may be used in other implementations of the present invention without departing from the spirit and scope of the present invention.

In addition, although each constitutional component may be implemented only in a pure hardware or software configuration, it also can be implemented by combining various hardware or software configurations performing the same function. In addition, two or more constitutional components may be implemented together by one-piece of hardware or software.

In addition, the expression of 'including' a component is an expression of an 'open type' which merely refers to existence of a corresponding component, and it should not be construed as precluding additional components.

Hereinafter, the present invention is described in detail with reference to the drawings.

FIG. 1 is a view schematically showing a payment information providing system using a wearable device 100 according to an embodiment of the present invention.

At this point, the wearable device 100, a product information providing device 200, a contents providing server 300, and a membership connection device 400 are connected through a wired and wireless communication network, and at this point, the communication network includes a base station controller, a base station transmitter and/or a relay. Here, the base station controller performs a function of relaying signals between the base station transmitter and a switching center. The communication network supports both synchronous and asynchronous types. Accordingly, in the case of the synchronous type, the transmitter of a transmission and reception base station will be a Base Station Transmission System (BTS), and the controller of the transmission and reception base station will be a Base Station Controller (BSC), whereas in the case of the asynchronous type, the transmitter of a transmission and reception base station will be a Radio Transceiver Subsystem (RTS), and the controller of the transmission and reception base station will be a Radio Network Controller (RNC). It is apparent that the communication network according to an embodiment of the present invention is not limited thereto, and it generally refers to a GSM network, not a CDMA network, and any one that can be used in an access network of a next-generation mobile communication system which will be implemented in the future.

The communication network may further include access points. The access point is a small base station such as a femto or pico base station frequently installed inside a building. Here, the femto or pico base station is categorized by the maximum number of servers and devices based on the classification of small base stations. In addition, the access point includes a short-range communication module for performing short-range communication with a portable terminal, such as Wi-Fi communication or the like. The short-range communication can be performed based on various specifications of Bluetooth communication, Zigbee communication, infrared communication (IrDA), Radio Frequency (RF) communication including Ultra High Frequency (UHF) and Very High Frequency (VHF), Ultra Wide Band (UWB) communication and the like, in addition to the Wi-Fi communication. The access point may extract a position of a data packet, assign a best communication path for the extracted position, and transfer the data packet to a next device, e.g., a wearable device 100', along the assigned communication path. The access point may share several circuits in a general network environment.

The access point is largely classified into a fixed access point and a mobile access point. The fixed access point may include a router, a repeater, a relay and the like, and the mobile access point may include a bridge product of a specific manufacturer such as Egg of KT Corporation. Such a mobile access point may read a receiving side address from the transmitting side information and transmit data after assigning a most suitable communication path while guaranteeing free mobility.

In the present invention, each device or server has a transmission and reception unit, and here, the transmission and reception unit includes an RF transmission means for up-converting the frequency of a transmitted signal and amplifying the signal and an RF reception means for low-noise amplifying a received signal and down-converting the frequency of the received signal. The transmission and reception unit may include at least one of a wireless communication module (not shown) and a wired communication module (not shown). In addition, the wireless communication module may include at least one of a wireless network communication module, a Wireless Local Area Network, Wireless Fidelity or Worldwide Interoperability for Microwave Access (WLAN, Wi-Fi or WiMAX) communication module and a Wireless Personal Area Network (WPAN) communication module.

The wireless communication module is a configuration for transmitting and receiving data according to a wireless communication method, and when a device or a server uses wireless communication, it may transmit or receive data for providing payment information using any one of the wireless network communication module, the wireless LAN communication module and the wireless PAN communication module.

A payment information providing system according to an embodiment of the present invention includes a wearable device 100, a product information providing device 200 and a contents providing server 300. More specifically, the payment information providing system includes: a wearable device 100 for recognizing and photographing a product image by sensing a motion of a user and transferring the photographed product image to a product information providing device 200, and receiving product information transferred from the product information providing device 200 and displaying the product information on a screen; the product information providing device 200 for receiving the product image from the wearable device 100 and providing information on a product related to the product image to the wearable device 100; and a contents providing server for receiving the product information from the product information providing device 200 and transferring digital contents to the wearable device 100 if a product to be purchased is selected according to the received product information.

Here, of the term 'digital contents', the 'digital' means a method of expressing information, and the 'contents' generally refers to information, knowledge and database configured in a variety of forms such as a symbol, a character, a sound, a video, a picture, an image and the like, and although the digital contents are contents configured in the form of a character, a sound, a picture, a video and the like distributed using the Internet, they do not mean only information and simple contents, but mean contents of a form containing a transaction and a service as a property for creating an added value using various information techniques. For example, the digital contents include applications related to a service provided by a service provider, which can be transferred to the wearable device 100 or a smart terminal device and executed therein, electronic coupons related to a store, electronic coupons related to membership and the like.

In another embodiment of the present invention, the payment information providing system may further include a membership connection device 400. At this point, the membership connection device 400 may perform authentication according to the authentication information transferred from the contents providing server 300, transfer membership information of the user to the contents providing server 300 if it is confirmed that the user is a membership holder as a result of the authentication, and transmit a membership acquisition request message to the contents providing server 300 and the wearable device 100 if it is confirmed that the user is not a membership holder.

If the payment information providing system includes the membership connection device 400, there is an effect of persuading a user to acquire a membership related to an affiliated company which provides digital contents and a service provider which provides a payment information providing service platform. Meanwhile, such a membership connection device 400 is an additional component, and a digital contents providing service related to the product information can be directly provided to a user without authenticating the membership acquired through the membership connection device 400.

Figure 2:
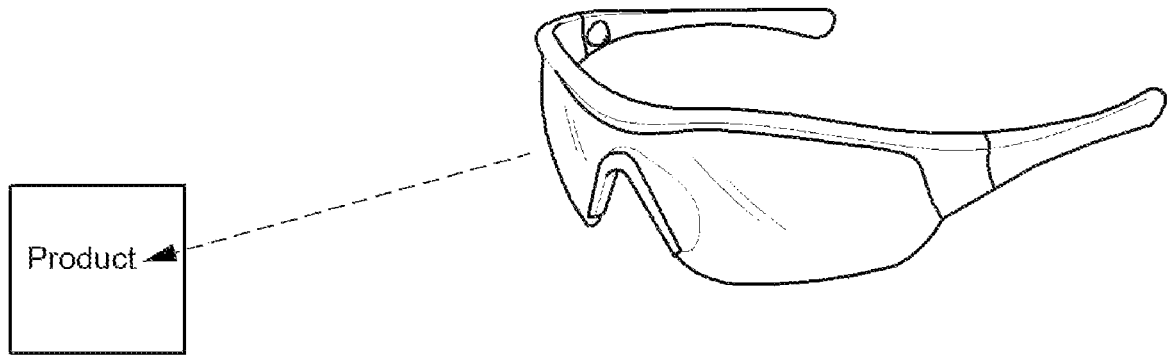
FIG. 2 is a view showing an example of recognizing and photographing a product image following the eyeline of a user by a wearable device according to an embodiment of the present invention.

FIG. 2 is a view showing an example of recognizing and photographing a product image following the eyeline of a user by a wearable device 100 according to an embodiment of the present invention.

If a user gazes at a product through a wearable device 100, the camera module 120 of the wearable device 100 may recognize an image of the product to which the eyeline of the user moves. At this point, the camera module 120 preferably means a camera module 120 of a smart glass.

Figure 3:
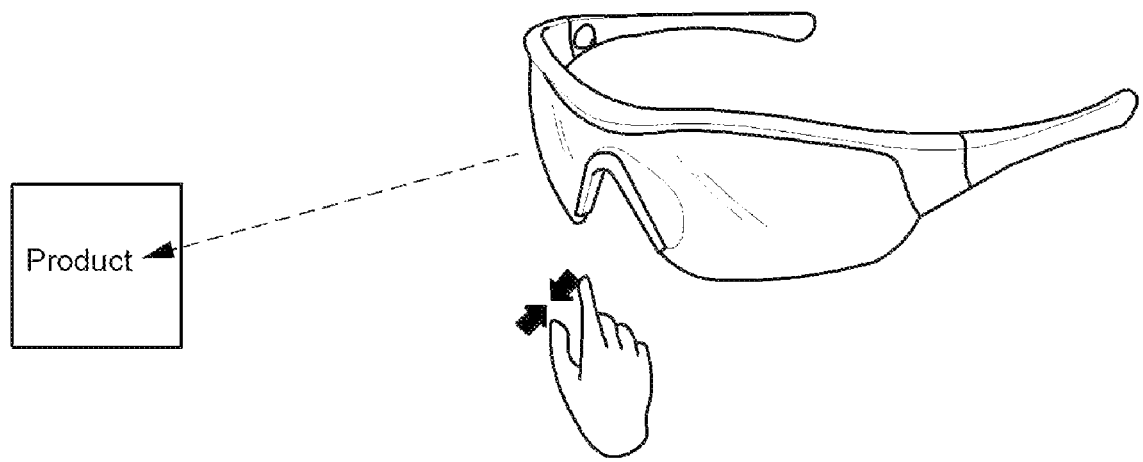
FIG. 3 is a view showing an example of selecting an interested product following a gesture of a user by a wearable device according to an embodiment of the present invention.

FIG. 3 is a view showing an example of selecting an interested product following a gesture of a user by a wearable device 100 according to an embodiment of the present invention.

For example, when a user takes a gesture of picking up a product while gazing at the product as shown in the figure, the corresponding product can be selected.

Figure 4:
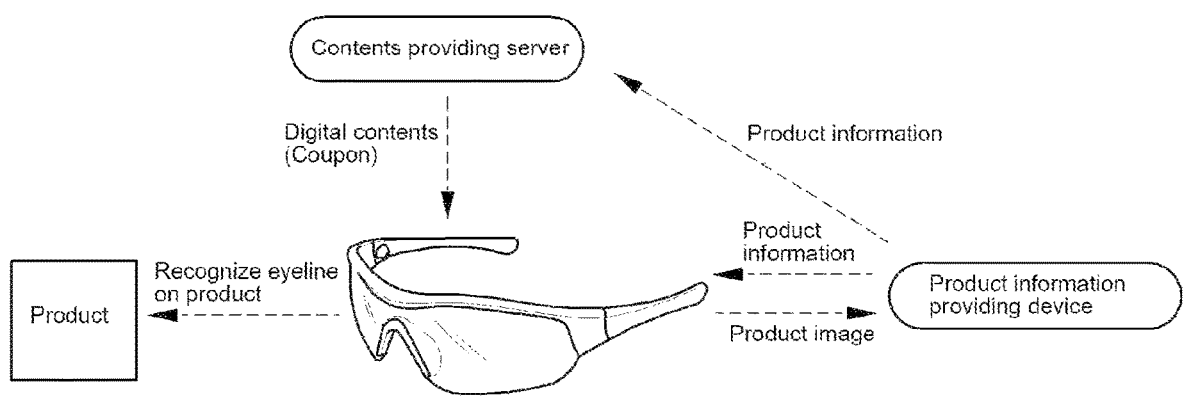
FIG. 4 is a view showing an example of providing payment information by a payment information providing system according to an embodiment of the present invention.

FIG. 4 is a view showing an example of providing payment information by a payment information providing system according to an embodiment of the present invention.

Referring to FIG. 4, if a user gazes at a product through a wearable device 100, the camera module 120 acquires a product image according thereto, and the product information providing device 200 transmits product information to the wearable device 100 and a contents providing server according to the acquired image and provides the wearable device 100 with the product information and digital contents according to the product image. Like this, the product information and the digital contents information may be displayed on the wearable device 100 as payment information. Meanwhile, the contents providing server 300 and the wearable device 100 may provide the same information to other smart devices which can be paired with the wearable device 100 so that the information can be displayed on corresponding smart devices.

Figure 5:
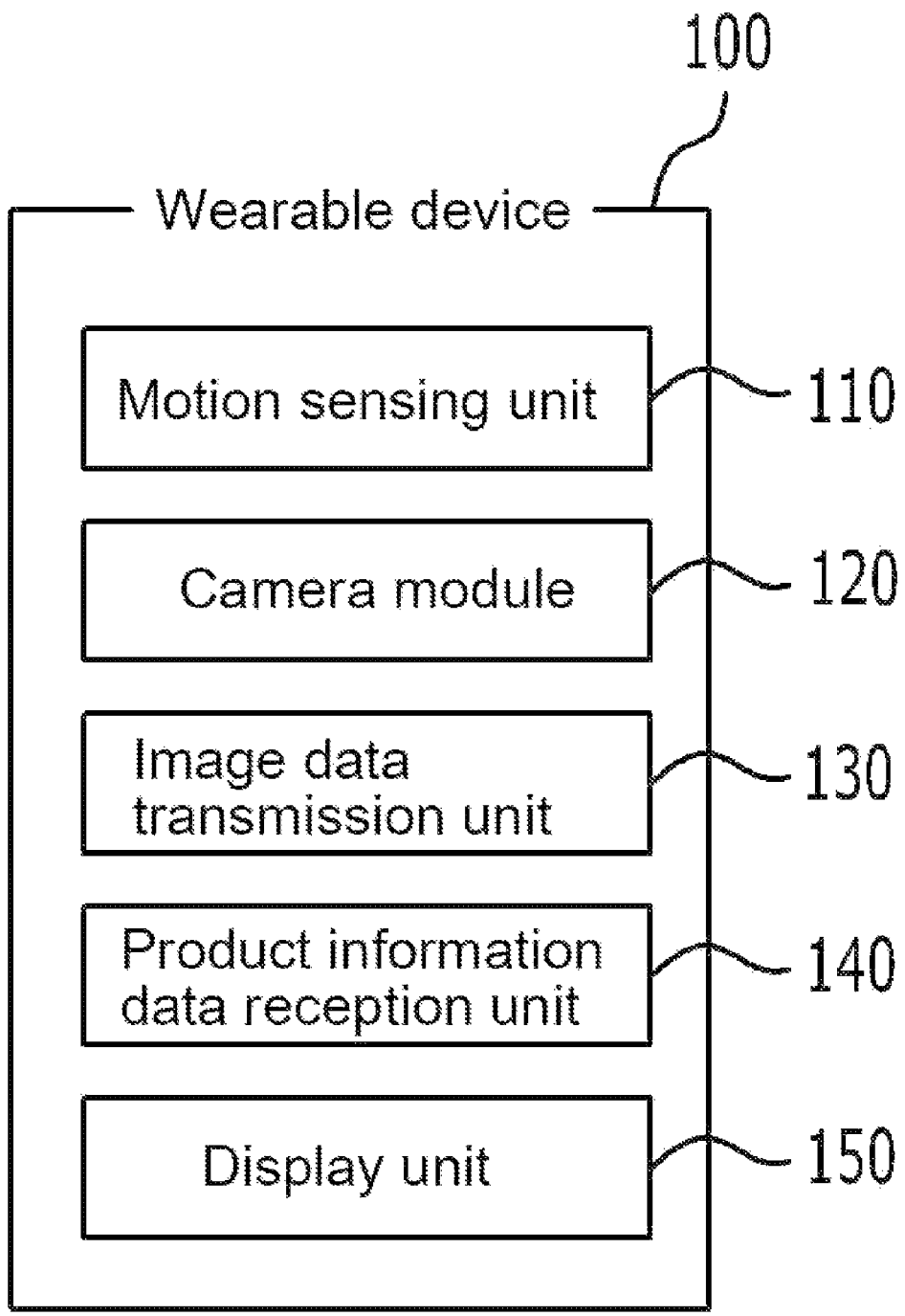
FIG. 5 is a block diagram showing the configuration of a wearable device according to an embodiment of the present invention.

FIG. 5 is a block diagram showing the configuration of a wearable device 100 according to an embodiment of the present invention.

A wearable device 100 according to an embodiment of the present invention includes a motion sensing unit 110, a camera module 120, an image storage unit, a product information data reception unit 140 and a display unit 150. More specifically, the wearable device 100 includes: a motion sensing unit 110 for sensing a motion of a user; a camera module 120 for recognizing and photographing a product image; an image storage unit for storing a product image data of the product image photographed by the camera module 120; an image data transmission unit 130 for transferring the product image data stored in the image storage unit to a product information providing device 200; a product information data reception unit 140 for receiving product information transferred from the product information providing device 200; and a display unit 150 for displaying the product information data received by the product information data reception unit 140 on a screen.

The motion sensing unit 110 senses a motion of a user. The motion of a user may be the eyeline of the user gazing at a product or a preset gesture performed on the product that the user is gazing at.

For example, if a user wearing the wearable device 100 gazes at a specific product, the camera module 120 recognizing the gaze onto the product may focus on the corresponding product, and the motion sensing unit 110 may sense a gesture of picking up the product or a gesture of a finger pointing at the product from the image of the focused product.

The camera module 120 recognizes and photographs a product image. At this point, if the motion of the user sensed by the motion sensing unit 110 matches a preset motion, the camera module 120 may recognize and photograph the product. Photographing a product image may be accomplished in order of focusing the camera module 120 on a product following the eyeline of the user and photographing the product according to a specific gesture or focusing the camera module 120 following the eyeline of the user and photographing the product when the user is gazing at the product for a preset time.

The image storage unit stores the product image data of the product photographed by the camera module 120. The image storage unit is an apparatus for storing image data, which includes a main memory device and an auxiliary memory device, and may store an application program needed for a functional operation of the wearable device 100 to store images. Such an image storage unit may largely include a program area and a data area. Here, when the wearable device 100 activates each function in response to a request of a user, it provides the functions by executing corresponding application programs under the control of the control unit. Particularly, the image storage unit according to an embodiment of the present invention may store an operating system for booting the camera module 120 of the wearable device 100, a program for image-processing the photographed image and the like.

The image data transmission unit 130 transfers the product image data stored in the image storage unit to the product information providing unit 200.

The product information data reception unit 140 receives product information transferred from the product information providing unit 200.

The display unit 150 displays product information data received by the data reception unit on the screen. The display unit 150 displays information on a series of operation states and operation results created while performing a function of the wearable device 100. In addition, the display unit 150 may display a menu of the wearable device 100 and user data or the like input by the user. Here, the display unit 150 may be configured of a Liquid Crystal Display (LCD), a Thin Film Transistor LCD (TFT-LCD), Organic Light Emitting Diodes (OLED), LEDs, Active Matrix Organic LEDs (AMOLEDs), a flexible display, a three-dimensional display or the like. At this point, the display unit 150 may be configured in the form of a touch screen, and when the display unit 150 is configured in the form of a touch screen like this, the display unit 150 may perform some or all of the functions of an input unit. Particularly, the display unit 150 according to an embodiment of the present invention displays the product information data received from the product information providing device 200 and digital contents transferred from the contents providing server 300.

Meanwhile, the product information data reception unit 140 may further receive digital contents transferred from the contents providing server 300 if a product to be purchased is selected according to the product information, and the display unit 150 may display payment information of the product reflecting the digital contents received by the product information data reception unit 140 on the screen.

Since comprehensive payment information showing payment information reflecting the digital contents (an electronic coupon) for a product to be purchased is provided, there is an effect of reasonably selecting a product when a user purchases the product.

Figure 6:
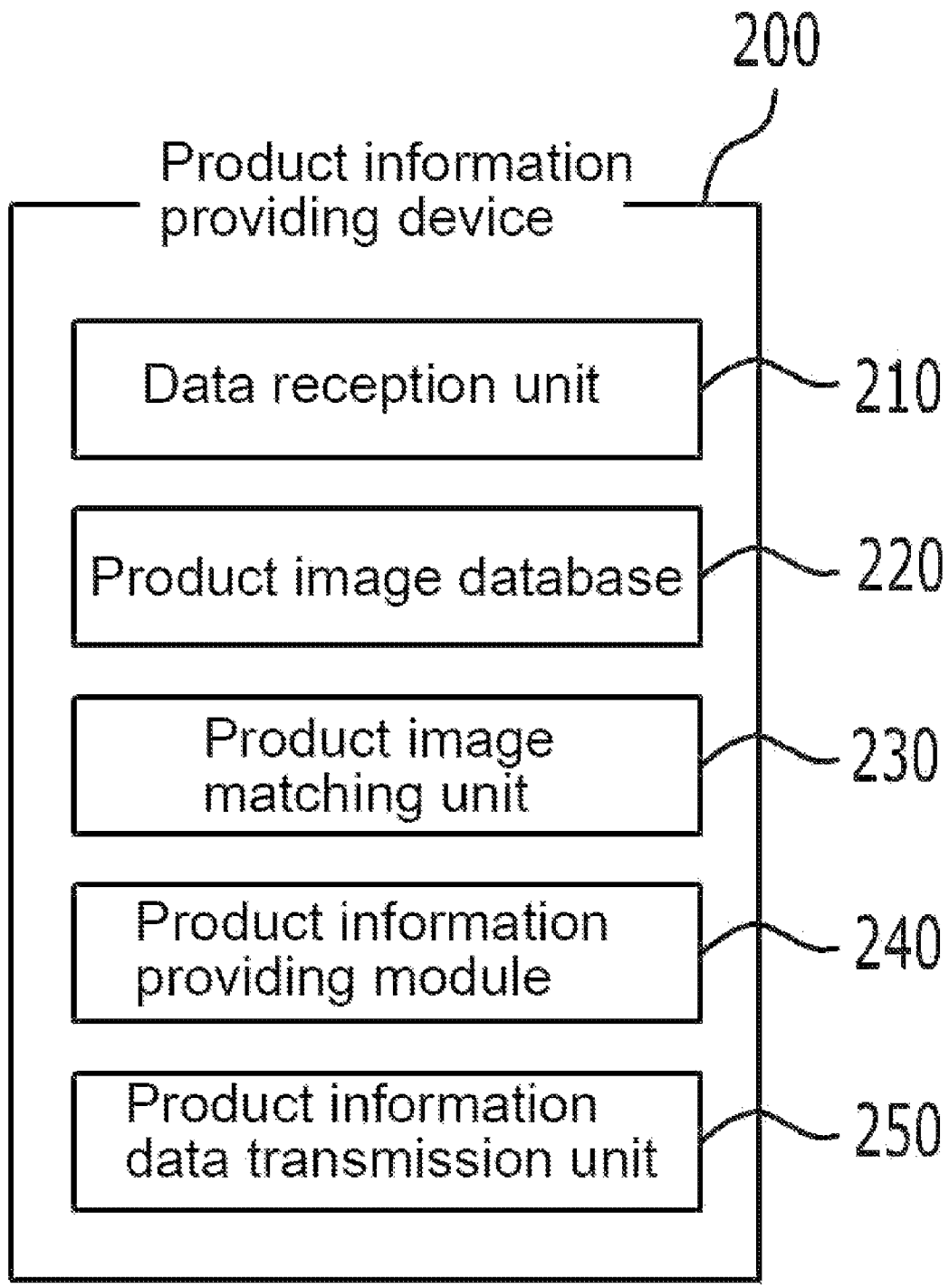
FIG. 6 is a block diagram showing the configuration of a product information providing device according to an embodiment of the present invention.

FIG. 6 is a block diagram showing the configuration of a product information providing device 200 according to an embodiment of the present invention.

A product information providing device 200 according to an embodiment of the present invention includes a data reception unit 210, a product image database 220, a product image matching unit 230, a product information providing module 240 and a product information data transmission unit. More specifically, the product information providing device 200 includes: a data reception unit 210 for receiving a digital contents information data or a product image data; a product image database 220 for storing image data of products displayed in a store; a product image matching unit 230 for determining whether or not the product image data received from a wearable device 100 by the data reception unit matches a product image data previously stored in the product image database 220; a product information providing module 240 for providing information on a matching product if it is determined by the product image matching unit 230 that the product image data of a store stored in the product image database 220 matches the product image data received from the wearable device 100; and a product information data transmission unit for transferring product information data provided by the product information providing module 240 to the wearable device 100.

The data reception unit 210 receives a digital contents information data or a product image data.

The product image database 220 stores product image data of products displayed in a store visited by the user. Here, the database is an apparatus for storing data and basically stores data such as environmental variables or the like used for search, classification, analysis and the like, and since the functions of the database can be implemented using general techniques, detailed descriptions on the implementation will be omitted.

The product image matching unit 230 determines whether or not the product image data received from a wearable device 100 by the data reception unit matches the product image data previously stored in the product image database 220.

If it is determined by the product image matching unit 230 that the product image data of a store stored in the product image database 220 matches the product image data received from the wearable device 100, the product information providing module 240 provides information on a matching product.

Meanwhile, if a matching product image data does not exists, a message requesting update of the product image and the product information can be transferred to the terminal (not shown) of a store manager to receive the image product and the product information from the store manager.

The product information data transmission unit transfers product information data provided by the product information providing module 240 to the wearable device 100.

Meanwhile, the product information data transmission unit may further transfer the product information data provided by the product information providing module 240 to a contents providing server 300.

Figure 7:
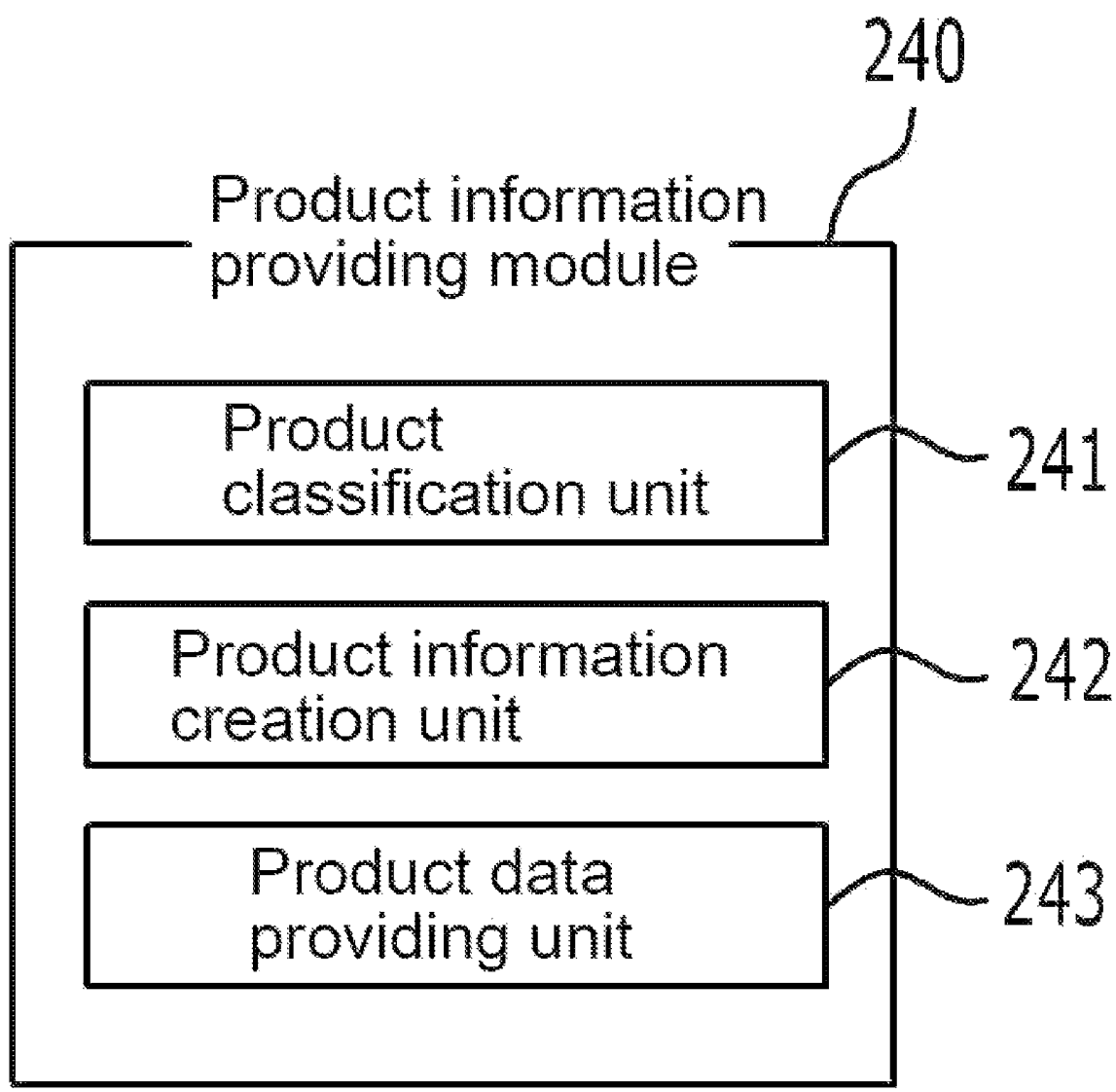
FIG. 7 is a block diagram showing the configuration of a product information providing module according to an embodiment of the present invention.

FIG. 7 is a block diagram showing the configuration of a product information providing module 240 according to an embodiment of the present invention.

The product information providing module 240 according to an embodiment of the present invention includes a product classification unit 241, a product information creation unit 242 and a product data providing unit 243. More specifically, the product information providing module 240 includes: a product classification unit 241 for classifying, by category, a type of a product corresponding to the product image data determined as being matched by the product image matching unit 230; a product information creation unit 242 for creating a product information data of the product classified by category by the product classification unit 241; and a product data providing unit 243 for transferring the product information data of the product created by the product information creation unit 242 to the product information data transmission unit.

The product classification unit 241 classifies a type of a product corresponding to the product image data determined as being matched by the product image matching unit 230 by category. Since the products are organized by the type through the process, product information can be collectively created by category.

The product information creation unit 242 creates a product information data of the product classified by category by the product classification unit 241. At this point, the product information data may include at least any one of information on a specification of the product, price information, a manufacturing date, a manufacturer and a product provided as a bundle. For example, the specification of the product may include the size and weight of the product and information on the expiry date, ingredients and the like in the case of a food, and the price information may be information comparing a price of the product, a discount rate of the product, a discounted price and the like. However, the product information data is not limited thereto and may include various kinds of information according to the information input by the store manager.

Meanwhile, the product information creation unit 242 may additionally create a product information data for a product of the same kind as the product classified by the product classification unit 241.

For example, a product information data can be additionally created and provided for a product (e.g., milk B) of the same kind as a product (e.g., milk A) selected by the user.

This can be added in response to a request of a service provider providing the payment information or a store manager, and the user may also create information on a product of the same kind if the user agrees to display information on the product of the same kind. Meanwhile, the information created for the product of the same kind can be provided to the wearable device 100 or the contents providing server 300 together with the information on the selected product. Like this, since other products of the same kind can be recommended by inversely using the information on the product selected by the user, the service provider or the store manager may utilize the present invention for marketing purposes.

Meanwhile, the product information creation unit 242 may create the product information data by reflecting the digital contents information data transferred from the contents providing server 300.

The product data providing unit 243 transfers the product information data of the product created by the product information creation unit 242 to the product information data transmission unit.

Figure 8:
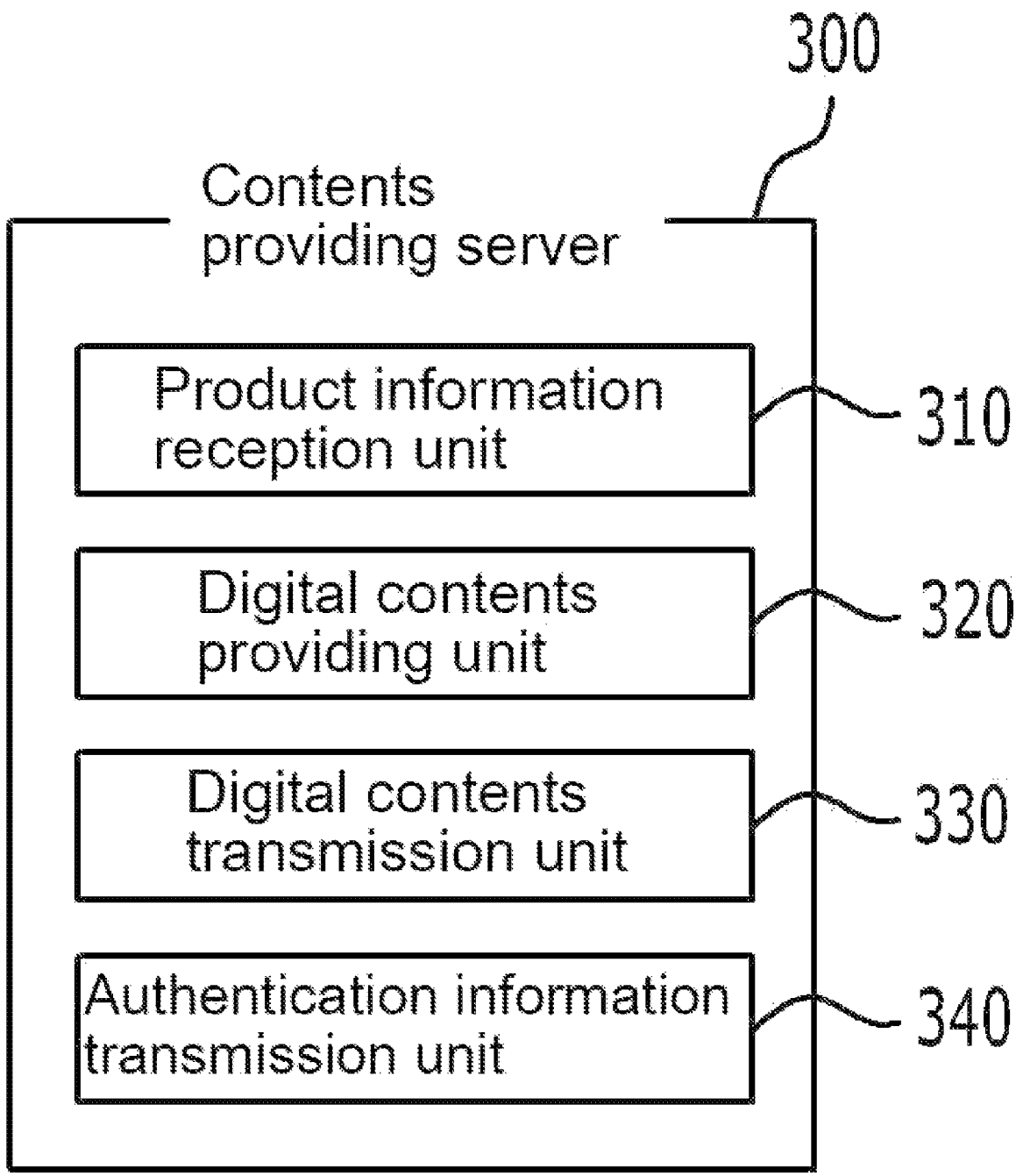
FIG. 8 is a block diagram showing the configuration of a contents providing server according to an embodiment of the present invention.

FIG. 8 is a block diagram showing the configuration of a contents providing server 300 according to an embodiment of the present invention.

A contents providing server 300 according to an embodiment of the present invention includes a product information reception unit, a digital contents providing unit 320 and a digital contents transmission unit 330. More specifically, the contents providing server 300 includes: a product information reception unit for receiving product information from the product information providing device 200; a digital contents providing unit 320 for transferring digital contents related to the product information received by the product information reception unit to a digital contents transmission unit 330; and the digital contents transmission unit 330 for transferring the digital contents transferred from the digital contents providing unit 320 to the wearable device 100.

The contents providing server 300 according to an embodiment of the present invention may further include an authentication information transmission unit 340. The authentication information transmission unit 340 transfers authentication information to the membership connection device 400 to confirm whether or not a user holds membership of an affiliated company or a product service provider related to the digital contents transferred from the digital contents providing unit 320 to the wearable device 100.

Figure 9:
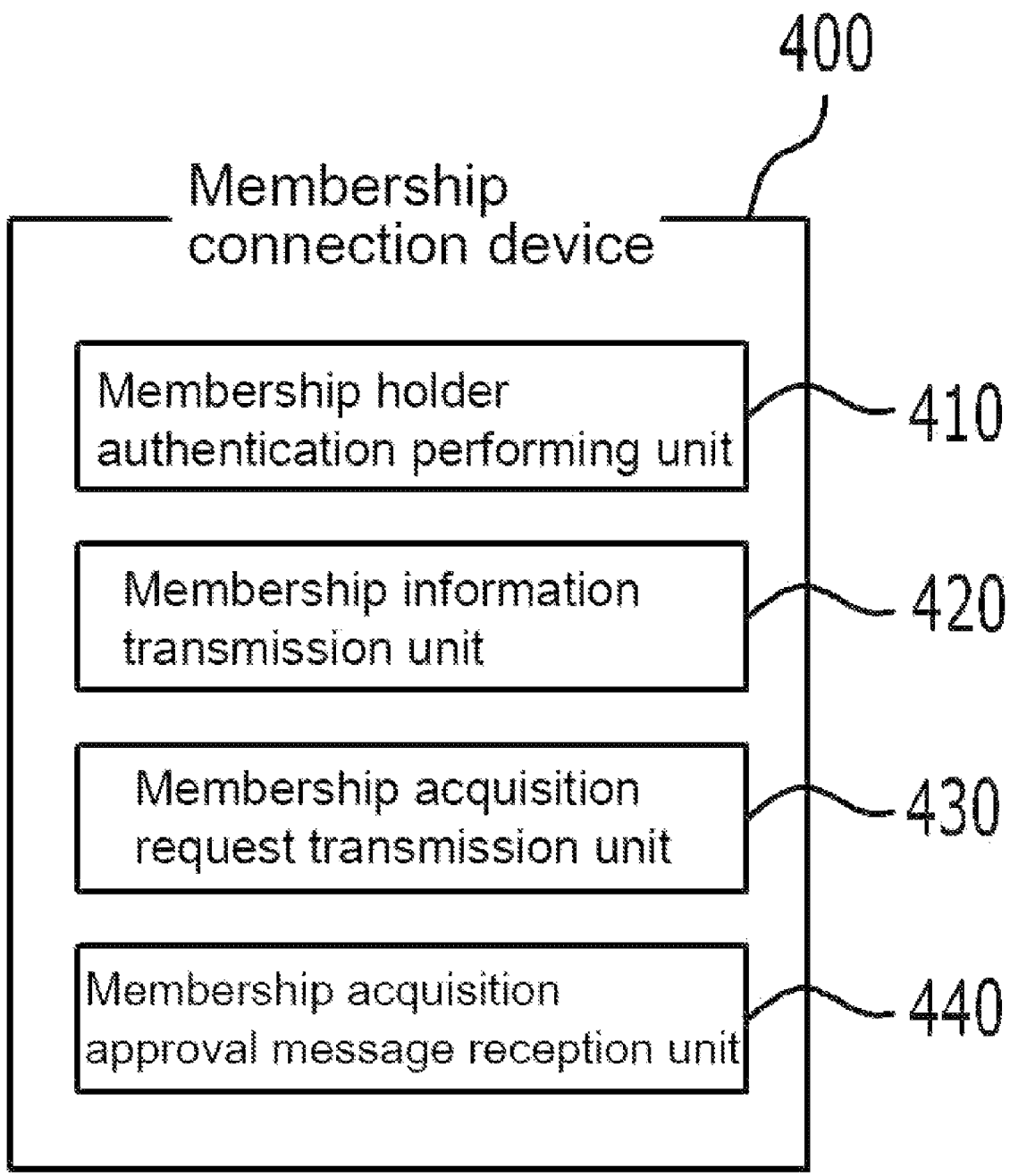
FIG. 9 is a block diagram showing the configuration of a membership connection device according to an embodiment of the present invention.

FIG. 9 is a block diagram showing the configuration of a membership connection device 400 according to an embodiment of the present invention.

A membership connection device 400 according to an embodiment of the present invention includes a membership holder authentication performing unit 410, a membership information transmission unit 420, a membership acquisition request transmission unit 430 and a membership acquisition approval message reception unit 440. More specifically, the membership connection device 400 includes: a membership holder authentication performing unit 410 for performing authentication according to authentication information transferred from the contents providing server 300; a membership information transmission unit 420 for transferring membership information of a user to the contents providing server 300 if it is confirmed that the user is a membership holder as a result of the authentication of the membership holder authentication performing unit; a membership acquisition request transmission unit 430 for transmitting a membership acquisition request message to the wearable device 100 if it is confirmed that the user is not a membership holder as a result of the authentication of the membership holder authentication performing unit; and a membership acquisition approval message reception unit 440 for receiving a membership acquisition approval message transmitted from the wearable device 100 in response to the membership acquisition request message.

The membership holder authentication performing unit 410 performs authentication according to the authentication information transferred from the contents providing server 300. At this point, the phone number and the name of the user, details of the provided contents and other diverse information can be used as the authentication information.

The membership information transmission unit 420 transfers membership information of the user to the contents providing server 300 if it is confirmed that the user is a membership holder as a result of the authentication of the membership holder authentication performing unit. If the membership information transmission unit 420 transfers the membership information to the contents providing server 300, the contents providing server 300 may obtain a right for transferring digital contents (coupons) to an electronic name card service user. Through the process like this, an effect of persuading the electronic name card service user to subscribe a service of an affiliated company which provides corresponding digital contents (coupons) is generated.

If it is confirmed that the user is not a membership holder as a result of the authentication of the membership holder authentication performing unit, the membership acquisition request transmission unit 430 transmits a membership acquisition request message to the wearable device 100.

The membership acquisition approval message reception unit 440 receives a membership acquisition approval message transmitted from the wearable device 100 in response to the membership acquisition request message.

Meanwhile, in the present invention, the membership connection device 400 is a device (a server) for inducing acquisition of membership, and it is a configuration that can be further included by the need of an electronic name card service provider or a platform provider.

Figure 10:
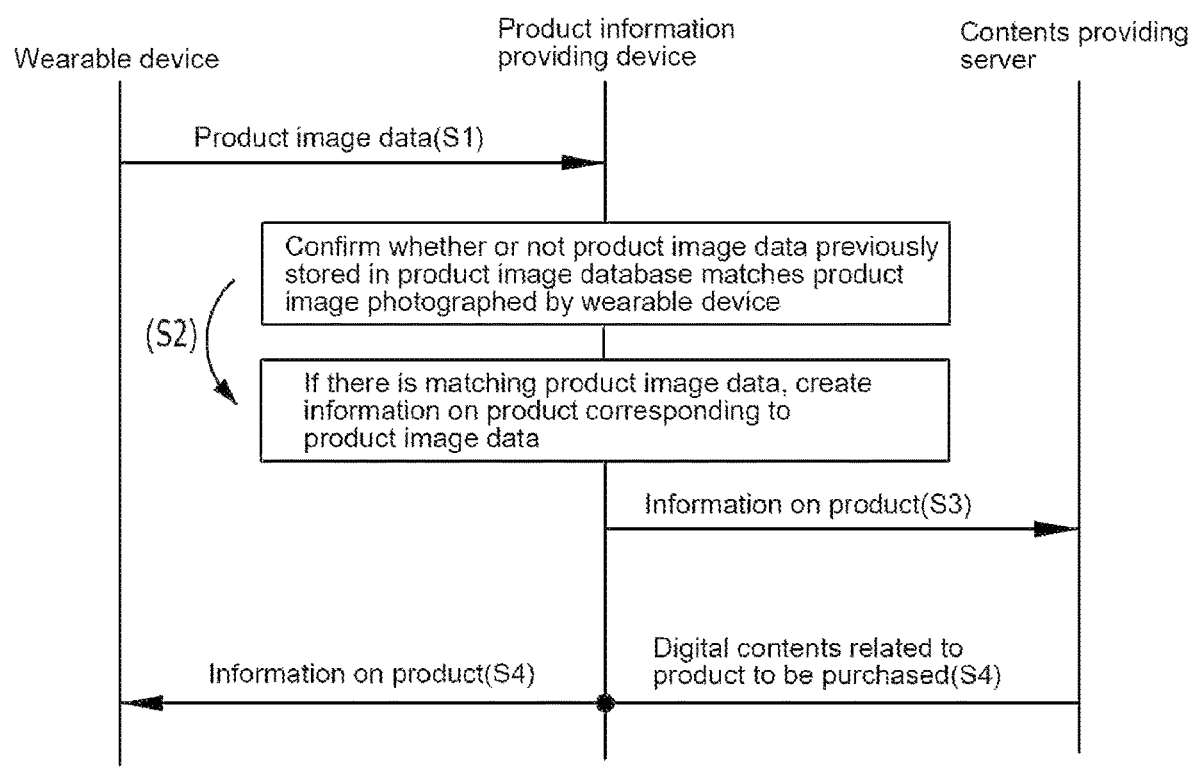
FIG. 10 is a sequence diagram illustrating a payment information providing method using a wearable device according to an embodiment of the present invention.

FIG. 10 is a sequence diagram illustrating a payment information providing method using a wearable device 100 according to an embodiment of the present invention.

A method of providing payment information by a payment information providing system according to an embodiment of the present invention includes the steps of (1) recognizing and photographing a product image (step S1), (2) determining whether or not an image data matches (step S2), (3) providing product information (step S3), and (4) providing digital contents (step S4). More specifically, the method of providing payment information by a payment information providing system includes the steps of: (1) recognizing and photographing, by a wearable device 100, a product image by sensing a motion of a user (step S1); (2) receiving, by a product information providing device 200, the product image photographed at step (1) and determining whether or not the product image matches a product image data previously stored in a product image database 220 (step S2); (3) providing an information data of a matching product if the product image data is matched at step (2) (step S3); and (4) receiving, by a contents providing server 300, the product information from the product information providing device 200 and transferring digital contents to the wearable device 100 according to the received product information (step S4).

Figure 11:
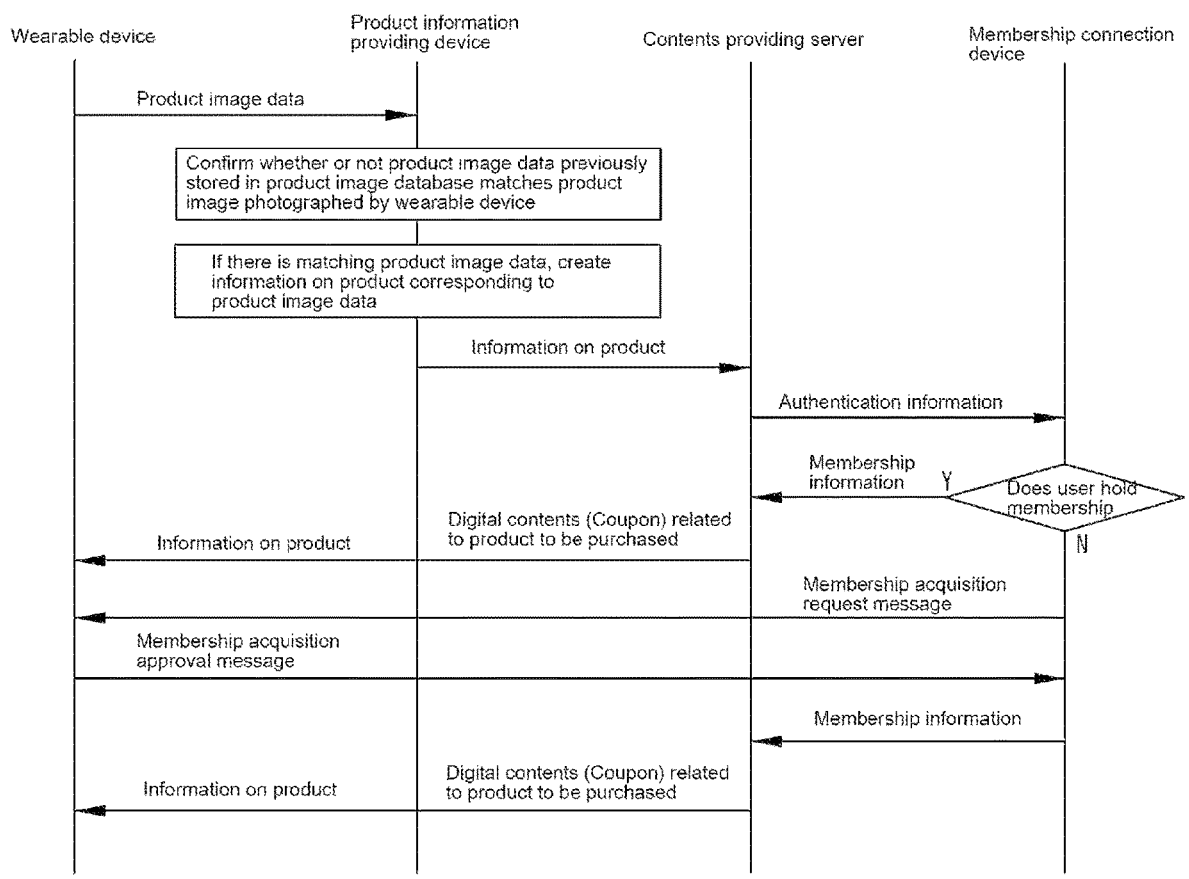
FIG. 11 is a sequence diagram illustrating a method of providing payment information by performing an authentication process using a membership connection device according to another embodiment of the present invention.

FIG. 11 is a sequence diagram illustrating a method of providing payment information by performing an authentication process using a membership connection device 400 according to another embodiment of the present invention.

Referring to FIG. 11, in another embodiment of the present invention, the method of providing payment information may further include, after step (3) and before step (4), the steps of: (a) confirming, by a membership connection device 400, whether or not a user holds membership of an affiliated company which provides digital contents using authentication information of the service user subscribing a payment information providing service; (b) transferring, by the membership connection device 400, membership information of the user to the contents providing server 300 if it is confirmed that the user is a membership holder at step (a), and transferring a membership acquisition request message to the contents providing server 300 and the wearable device 100 if it is confirmed that the user is not a membership holder at step (a); and (c) transferring the membership information of the user to the contents providing server 300 if a membership acquisition approval message is transferred from the wearable device 100 in response to the membership acquisition request message transferred at step (b).

A method of providing payment information by a wearable device 100 according to an embodiment of the present invention includes the steps of: (1) sensing a motion, (2) recognizing and photographing a product image, (3) storing the photographed image, (4) transmitting information on the stored image, (5) receiving product information, and (6) displaying the product information and contents information. More specifically, the method of providing payment information by a wearable device 100 includes: (1) a motion sensing step of sensing a motion of a user; (2) a step of recognizing and photographing a product image according to the motion recognized at step (1); (3) an image storage step of storing a product image data of the product image photographed at step (2); (4) an information transmission step of transferring the product image data stored at step (3) to a product information providing device; (5) a data reception step of receiving product information corresponding to the product image data transferred at step (4); and (6) a display step of displaying the product information data received at step (5).

A motion of a user is sensed at step (1). At this point, the motion of the user is a preset gesture performed with respect to the eyes of the user gazing at a product or a product that the user is gazing at, and a product can be selected according to various gestures.

At step (2), the camera module 120 recognizing the sensed motion of the user photographs a product image. Meanwhile, if the motion of the user matches a preset motion, the camera module 120 may recognize and photograph the product. At this point, the product image can be photographed by recognizing the eyes of the user gazing at the product, and on the other hand, according to settings, the product image can be photographed when a specific gesture is performed together with the recognition of the eyes gazing at the product.

At step (3), the product image data of the product image photographed by the camera module 120 at step (2) is stored.

At step (4), the product image data is transferred to the product information providing device 200 to create product information of a product corresponding to the stored product image data.

At step (5), product information corresponding to the transferred product image data is received from the product information providing device 200.

At step (6), the received product information data is displayed on a screen.

A method of providing payment information by a product information providing device 200 according to an embodiment of the present invention includes the steps of: (1) receiving a data, (2) determining whether or not the image data matches, (3) providing product information, and (4) transmitting product information data. More specifically, the method of providing payment information by a product information providing device 200 includes: (1) a data reception step of receiving a digital contents information data and a product image data; (2) a step of determining whether or not a product image data of a visited store previously stored in a product image database 220 matches the product image data received at step (1); (3) a product information providing step of providing, if it is determined at step (2) that the product image data of a store stored in the product image database 220 matches the product image data received from a wearable device 100, an information data of a matching product; and (4) a data transmission step of transferring the product information data provided at step (3) to the wearable device 100.

At step (1), a digital contents information data and a product image data is received.

At step (2), whether or not a product image data of a visited store previously stored in the product image database 220 matches the product image data received at step (1) is determined.

At step (3), if it is determined at step (2) that the product image data of a store stored in the product image database 220 matches the product image data received from the wearable device 100, an information data of a matching product is provided. At this point, step (3) may further include: (a) a product classification step of classifying, by category, a type of a product corresponding to the product image data determined as being matched at step (2); (b) a product information creation step of creating a product information data of the product classified by category at step (a); and (c) a product data providing step of transferring the information data of the product created at step (b) to a product information data transmission unit.

At step (4), the product information data provided at step (3) is transferred to the wearable device 100.

Meanwhile, the method of providing payment information may further include, after step (2) and before step (3), the step of receiving, if a matching product image data does not exist, a product image and product information from a product management server.

A method of providing payment information by a contents providing server 300 according to an embodiment of the present invention includes: (1) a product information reception step, (2) a digital contents providing step and (3) a digital contents transmission step. More specifically, the method of providing payment information by a contents providing server 300 includes: (1) a product information reception step of receiving product information from a product information providing device 200; (2) a digital contents providing step of transferring digital contents related to the product information received at step (1) to a digital contents transmission unit 330; and (3) a digital contents transmission step of transferring the digital contents transferred at step (2) to a wearable device 100.

Meanwhile, the method of providing payment information by a contents providing server 300 may further include, after step (2) and before step (3), an authentication information transmission step of transferring authentication information to a membership connection device 400 to confirm whether or not a user holds membership of an affiliated company or a payment information provider related to the digital contents.

A method of providing payment information by a membership connection device 400 according to an embodiment of the present invention includes (1) a membership holder authentication performing step, (2) a membership acquisition request message transmission step and (3) membership acquisition approval message receiving step. More specifically, the method of providing payment information by a membership connection device 400 includes: (1) a membership holder authentication performing step of performing authentication according to authentication information transferred from a contents providing server 300; (2) a step of transferring membership information of a user to the contents providing server 300 if it is confirmed that the user is a membership holder as a result of the authentication at step (1) and transmitting a membership acquisition request message to a wearable device 100 if it is confirmed that the user is not a membership holder; and (3) a membership acquisition approval message receiving step of receiving a membership acquisition approval message transmitted from the wearable device 100 in response to the membership acquisition request message transmitted at step (2).

Like this, according to the present invention, payment information of a product can be provided promptly and correctly in real-time by recognizing a product image and creating product information using a wearable device 100, and a service associated with digital contents can be provided in real-time using the product information.

In addition, a custom-tailored product is provided to the user by inversely using the information collected using the wearable device 100, and a digital contents service associated with the product can be provided.

A service providing method using such a payment information providing system can be created as a computer program, and codes and code segments constituting the computer program may be easily reasoned by a programmer in the art. In addition, the program related to the payment information providing method using a payment information providing system is stored in an information storage medium that can be read by an electronic device and can be read and executed by the electronic device.

Figure 12:
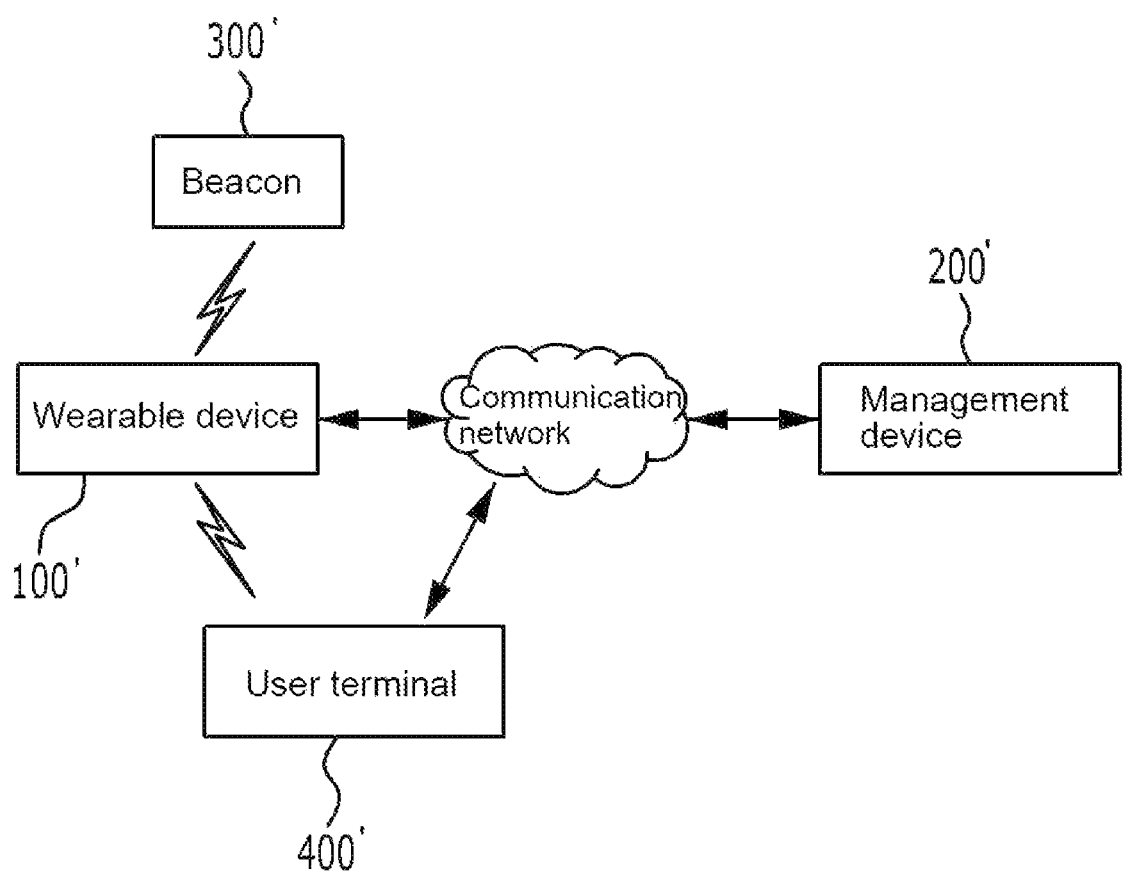
FIG. 12 is a configuration view showing the functional blocks of a system for providing coupons and points by sensing a payment motion according to an embodiment of the present invention.

FIG. 12 is a configuration view showing the functional blocks of a system for providing coupons and points by sensing a payment motion according to an embodiment of the present invention.

Referring to FIG. 12, a system for providing coupons and points by sensing a payment motion according to an embodiment of the present invention includes a wearable device 100' and a product information providing device 200'. More specifically, the system for providing coupons and points by sensing a payment motion includes: a wearable device for storing one or more payment motions of a user, sensing a motion of the user, grasping whether or not the sensed motion of the user matches the stored payment motion, and requesting information on coupons, points or events that can be used at a store where the user is positioned from a product information providing device if the motions are matched; and a product information providing device for storing the information on coupons, points or events that can be used at a store, extracting information on coupons, points or events that can be used at a store where the user is positioned, and transmitting the extracted information to the wearable device in response to a request from the wearable device.

A wearable device 100' is literally a device that can be put on a human body, and there are various kinds of wearable devices according to wearing portions, such as glasses, a watch, shoes, a ring, a belt, a band, a necklace, a headset, clothes and the like.

Meanwhile, construction of a system capable of making a payment through a wearable device 100' emerges as a main issue in the related industries recently. For example, although a user does not take out his or her wallet and make a payment, the user may make a payment through a wearable device 100' by installing a near field communication (NFC) function in the wearable device 100' itself and registering a credit card and authentication information of the user in an application. That is, the wearable device may perform a mobile wallet function on behalf of conventional wallets. However, since there are a lot of problems related to security, such as personal information of a user, approval of card payment and the like, there are a lot of technical problems to be solved.

Particularly, when a user makes a payment at a certain store, there is a problem in that the user does not remember all the information on coupons, points or events that can be used at a corresponding store, they should be searched for through an application or the like.

Accordingly, the wearable device 100' of the present invention is to provide convenience of payment by sensing that a user is going to make a payment by recognizing a payment motion without a physical input of the user and receiving information on coupons, points or events that can be used at a store where the user is positioned on the basis of position information of the user.

To this end, the wearable device 100' of the present invention mounts a sensor for sensing a motion of a user and analyzes movement of muscles of the user or specific motions performed by the user. For example, when the user takes a motion of picking up a card, the wearable device 100' senses that the muscles of the thumb and the index finger are used more than a predetermined strength, and if this is a previously stored payment motion of the user, it is recognized as a motion of the user going to make a payment, and the wearable device may transmit information on the store where the user is positioned to the product information providing device 200' and receive information on coupons, points or events handled at the store where the user is positioned.

The product information providing device 200' may collect information on the user, information on the store where the user is positioned and the like received from the wearable device 100' and transmit appropriate information to the user. More specifically, the product information providing device 200' may transmit information such as a menu of a store for ordering, coupons usable at the store, points usable at the store, events progressed at the store and the like to the wearable device 100' of the user or the user terminal 400'.

Meanwhile, the wearable device 100' or the user terminal 400' described below and the product information providing device 200' are preferably connected through a wired and wireless network. The communication network includes a base station controller, a base station transmitter and/or a relay. Here, the base station controller performs a function of relaying signals between the base station transmitter and a switching center. The communication network supports both synchronous and asynchronous types. Accordingly, in the case of the synchronous type, the transmitter of a transmission and reception base station will be a Base Station Transmission System (BTS), and the controller of the transmission and reception base station will be a Base Station Controller (BSC), whereas in the case of the asynchronous type, the transmitter of a transmission and reception base station will be a Radio Transceiver Subsystem (RTS), and the controller of the transmission and reception base station will be a Radio Network Controller (RNC). It is apparent that the communication network according to an embodiment of the present invention is not limited thereto, and it generally refers to a GSM network, not a CDMA network, and any one that can be used in an access network of a next-generation mobile communication system which will be implemented in the future.

The communication network may further include access points. The access point is a small base station such as a femto or pico base station frequently installed inside a building. Here, the femto or pico base station is categorized by the maximum number of wearable devices 100' or user terminals 400' based on the classification of small base stations. In addition, the access point includes a short-range communication module for performing short-range communication with the wearable devices 100' or the user terminals 400', such as Wi-Fi communication or the like. The short-range communication can be performed based on various specifications of Bluetooth communication, Zigbee communication, infrared communication (IrDA), Radio Frequency (RF) communication including Ultra High Frequency (UHF) and Very High Frequency (VHF), Ultra Wide Band (UWB) communication and the like, in addition to the Wi-Fi communication. The access point may extract a position of a data packet, assign a best communication path for the extracted position, and transfer the data packet to a next device, e.g., a wearable device 100' or a user terminal 400', along the assigned communication path. The access point may share several circuits in a general network environment.

The access point is largely classified into a fixed access point and a mobile access point. The fixed access point may include a router, a repeater, a relay and the like, and the mobile access point may include a bridge product of a specific manufacturer such as Egg of KT Corporation. Such a mobile access point may read a receiving side address from the transmitting side information and transmit data after assigning a most suitable communication path while guaranteeing free mobility.

As another embodiment of the present invention, the system for providing coupons and points by sensing a payment motion may further include a beacon 300' for sensing approach of the wearable device 100' and transmitting position information of a store to the wearable device 100' approached within a predetermined distance, and the wearable device 100' transmits the position information of the store received from the beacon 300' to the product information providing device 200' and receives information on coupons, points or events that can be used at the sore from the product information providing device 200'.

The beacon 300' is a means for sending a signal to a wearable device 100' or a user terminal 400' of a user within a short distance (approximately 50 to 70 m) to inform position information or the like of the user, and it is a technique in which the beacon 300' installed in a store periodically sends an ID and a Received Signal Strength Indicator (RSSI) value as a signal and receives information if the user of the wearable device 100' or the user terminal 400' enters within the range of the signal. The beacon 300' functions as a reference point for informing a position, uses a communication technique such as Dedicated Short Range Communication (DSRC), ultrasonic wave, infrared ray, Bluetooth, CDMA, LTE, WiFi, LiFi or the like to transfer information, and is classified into a sound-based low frequency beacon 300', an LED beacon 300', a Wi-Fi beacon 300', a Bluetooth beacon 300' and the like. Particularly, the present invention may use a short-range wireless communication based on the Bluetooth Low Energy (BLE) protocol. Therefore, although it is difficult to grasp an indoor position using the GPS, the beacon 300' is advantageous in that information on a store where a user is positioned can be confirmed correctly since the beacon 300' makes it possible to grasp the position of an indoor user positioned within the range of radius.

Accordingly, when a user of the present invention enters a store in which a beacon 300' is installed, the beacon 300' sends an ID containing position information of the store to the wearable device 100', and the wearable device 100' transmits the position information of the corresponding store to the product information providing device 200' so that the product information providing device 200' may transmit information on coupons, points or events that can be used by the user at the corresponding store.

As another embodiment of the present invention, the system for providing coupons and points by sensing a payment motion may further include a user terminal 400' for receiving information on coupons, points or events from the product information providing device 200' and making a mobile payment by reflecting the information on coupons, points or events. Therefore, payments can be made through the user terminal 400 such as a smart phone or the like used by the user himself or herself, as well as the wearable device 100'.

Here, the user terminal 400' includes a Personal Digital Assistant (PDA), a smart phone, a cellular phone, a Personal Communication Service (PCS) phone, a Global System for Mobile (GSM) phone, a Wideband CDMA (W-CDMA) phone, a CDMA-2000 phone, a Mobile Broadband System (MBS) phone and the like which can be applied in a variety of wired and wireless environments. On the other hand, although the user terminal 400' may represent a small portable device, embodiments of the present invention will not be specially limited thereto since the user terminal can be referred to as a mobile communication terminal if the user terminal includes a camcorder, a laptop computer or the like.

Figure 13:
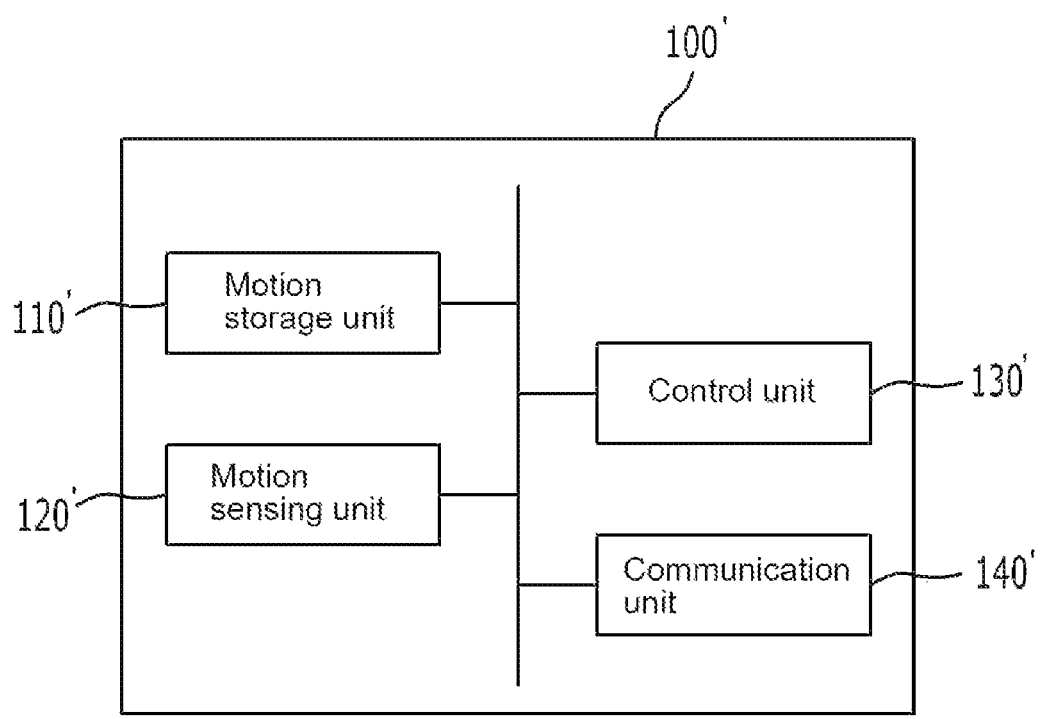
FIG. 13 is a configuration view showing the functional blocks of a wearable device for providing coupons and points by sensing a payment motion according to an embodiment of the present invention.

FIG. 13 is a configuration view showing the functional blocks of a wearable device 100' for providing coupons and points by sensing a payment motion according to an embodiment of the present invention.

Referring to FIG. 13, a wearable device 100' for providing coupons and points by sensing a payment motion according to an embodiment of the present invention may include: a motion storage unit 110' for storing one or more payment motions of a user; a motion sensing unit 120' for sensing a motion of the user; and a control unit 130' for grasping whether or not the sensed motion of the user matches the stored payment motion and, if the motions are matched, requesting information on coupons, points or events that can be used at a store where the user is positioned from a product information providing device.

The motion storage unit 110' may store one or more payment motions desired by a user to be assigned as payment motions in the wearable device 100'. In addition, to recognize the motions, the motion sensing unit 120' described below recognizes motions of the user and stores the motions in the motion storage unit 110'. For example, the motion sensing unit 120' which will be described below may sense the speed and angle of moving an arm when the user takes bills or a card out of a wallet by narrowing a thumb and an index finger and store the motion in the motion storage unit 110'.

The motion sensing unit 120' senses a motion of the user, and at this point, the motion includes motions from a minute motion to a big motion of all means of the body of the user. For example, if the wearable device 100' is a smart glass, it may sense specific movements of the eyes of the user as a motion, and if the wearable device 100' is a smart watch or a smart band, it may sense movements of the fingers or the palm of the user through muscles or nerves, and if the wearable device 100' is a smart ring put on a finger, it may sense a motion through the change of moving direction and acceleration of the finger when the user takes a motion of drawing a specific picture using the finger. Meanwhile, the embodiments described above are merely examples, and various means, other than these, for sensing a motion of the user can be included.

At this point, as an embodiment of the present invention, the motion sensing unit 120' may use an electromyography sensor for sensing an electrical signal of a muscle changing according to a motion of the user. A wearable device 100', such as a smart watch or a smart band put on a part of the body in which muscles briskly move, preferably uses the electromyography sensor. The electromyography sensor may grasp a motion of the user by grasping contraction and relaxation states of muscles of the user.

For example, since the muscles used when the user moves fingers are different from each other, the electromyography sensor may grasp movement of each finger, and since a motion also can be sensed through a combination of the fingers, as the electromyography sensor senses various motions, the control unit 130' described below may issue a command corresponding to the motion.

In addition, as another embodiment of the present invention, the motion sensing unit 120' may use an inertial sensor for sensing an acceleration changing according to a motion of the user. The inertial sensor detects an inertial force generated according to the movement of the body after the user wears the wearable device 100' and detects an inertial force acting on an inertial object by measuring an acceleration, i.e., a speed, a direction, a distance or the like, of a body portion moved by the user. The inertial sensor is classified into an accelerometer and a gyroscope, and development of inertial sensors using a laser and non-mechanical type inertial sensors are also under progress.

When a motion sensing unit 120' using such an inertial sensor is used, an example assuming that the wearable device 100' is a smart ring put on a finger can be considered. At this point, when the user takes a motion of drawing a specific picture, the motion can be sensed through change of direction and acceleration.

For example, if the user draws 'ON' in the air using a finger wearing a smart ring, the motion sensing unit 120' senses such a motion of the user, and the control unit 130' described below searches for a motion matching to the motion of the user among the previously stored payment motions. If the motion of the user matches a payment motion, the control unit 130' described below requests information on coupons, points or events that can be used at a store where the user is positioned from the product information providing device, and the product information providing device transmits the information to the wearable device, and thus the user may conveniently receive and use the information on coupons, points or events that can be used at a store where the user is positioned without a physical input.

If whether or not the sensed motion of the user matches the previously stored payment motion is grasped and the motions are matched, the control unit 130' may request information on coupons, points or events that can be used at a store where the user is positioned from the product information providing device.

For example, if the user draws 'OK' in the air or draws 'O' by narrowing a thumb and an index finger, the motion sensing unit 120' senses such a motion of the user, and the control unit 130' searches for a motion matching to the motion of the user among the payment motions previously stored in the motion storage unit 110'. If the motion of the user is a payment motion, the control unit 130' requests information on coupons, points or events that can be used at a store where the user is positioned from the product information providing device.

In addition, the control unit 130' may make a payment by transmitting the payment information of the user previously stored in the wearable device 100' to an external device. Here, the payment information includes information selected by the user as a payment means, and for example, when the user make a payment using credit card information, the payment information includes a company, a card number, an expiry date and a CVC number related to the credit card, and it is preferred that the payment information is previously stored in the wearable device 100'.

As an embodiment of progressing a payment, as the user takes a payment motion, the control unit 130' transmits a signal containing payment information of the user to a POS terminal of the store through a wireless communication, and if information on an amount to be paid is transmitted from the POS terminal, the control unit 130' may approve the amount through a previously stored motion in the wearable device 100' itself. With regard to such a payment approval motion, the final payment approval can be accomplished by distinguishing the user through a means such as vein authentication or the like through the wearable device 100'.

Here, the POS is an acronym of point-of-sale, and a POS terminal is a terminal device installed at a cash register of a store or the like to input sale information of a product on each occasion and transmit the sale information to a central computer by way of a communication link. Although a general configuration of the POS terminal is marking in advance a type, a price and the like of a product on a price tag as symbols, reading the symbols using a reader or the like and summarizing sale information, in the present invention, it is preferable to wirelessly transmit and receive payment information of the user or information on an amount to be paid at the store to and from the wearable device 100' or the user terminal 400'.

In addition, as an embodiment of granting a final approval by the user terminal 400', rather than the wearable device 100', the amount to be paid that the wearable device 100' has received from the POS terminal in the previous embodiment is transmitted to the user terminal 400' so that a payment screen for displaying the payment amount and the information on coupons, points or events that can be used at the corresponding store may displayed on the user terminal 400'. Then, the final payment approval can be granted using a means such as fingerprint authentication or the like for the security of the user.

As another embodiment of the present invention, a wearable device 100' for providing coupons and points by sensing a payment motion according to another embodiment of the present invention may further include a communication unit 140' for transmitting a signal created by the control unit 130' to the product information providing device 200' together with GPS information through a communication network and receiving information on coupons, points or events of the store based on the GPS information from the product information providing device 200'. Here, the communication network includes both wired communication and wireless communication, and the wearable device 100' for providing coupons and points by sensing a payment motion and the product information providing device 200' may be connected to each other through the communication network.

At this point, the communication unit 140' receives position information of the store from the beacon 300', transmits the position information of the store received from the beacon 300' to the product information providing device 200', and receives information on coupons, points or events that can be used at the store from the product information providing device 200'. Although it is difficult to grasp an indoor position using the GPS, the beacon 300' is advantageous in that information on the store where the user is positioned can be confirmed correctly since the beacon 300' makes it possible to grasp the position of an indoor user positioned within the range of radius.

Accordingly, when a user of the present invention enters a store in which the beacon 300' is installed, the beacon 300' sends an ID containing information on the position of the store to the wearable device 100', and the wearable device 100' transmits the position information of the corresponding store to the product information providing device 200', and the product information providing device 200' may transmit information on coupons, points or events that can be used by the user at the corresponding store.

In addition, if information related to the payment at the store such as coupons, points or events is received from the product information providing device 200', the control unit 130' makes a payment by transmitting payment information of the user reflecting the received information on coupons, points or events to an external device.

For example, the user may request payment information of the user and information on an amount to be paid at the POS terminal of the store by applying a discount coupon, a one-plus-one promotion coupon or the like received from the product information providing device 200' or applying accumulated points that can be used at the store, or the user may receive information on an event progressed at the store and request information on an amount to be paid at the POS terminal of the store after participating in the corresponding event.

Figure 14:
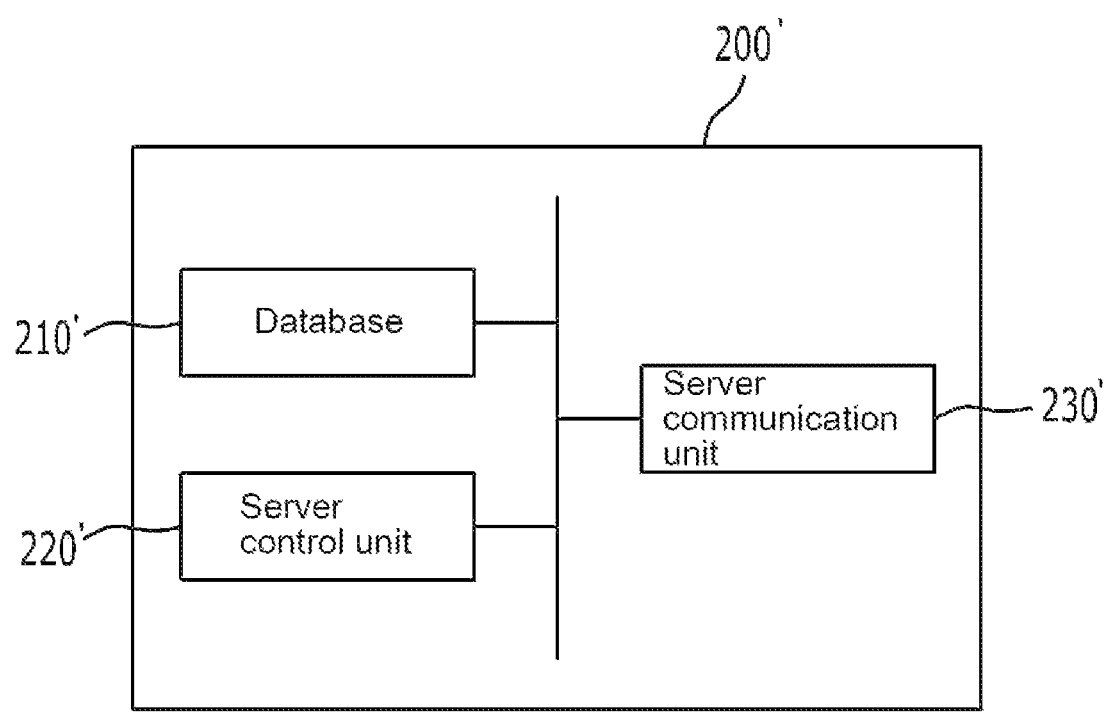
FIG. 14 is a configuration view showing the functional blocks of a product information providing device according to an embodiment of the present invention.

FIG. 14 is a view showing the functional blocks of a product information providing device 200' according to an embodiment of the present invention.

Referring to FIG. 14, a product information providing device 200' according to an embodiment of the present invention includes a database 210', a server control unit 220' and a server communication unit 230'. More specifically, the product information providing device 200' includes: a database 210' for storing information on coupons, points or events that can be used at a store; a server control unit 220' for extracting information corresponding to a signal received from a wearable device 100' from the database 210'; and a server communication unit 230' for transmitting the corresponding information to the wearable device 100' or a user terminal 400'.

The database 210' may receive position information of the user from the wearable device 100' and store various kinds of information that can be used at a store used by the user, such as user information (membership information of the user, frequently used stores, information on a store that has approved inquiry of the user information, etc.), information on coupons that can be used at a specific store, information on point accumulation of the user at each store, information on events progressed at a store and the like, and the database 210' may update information if new information is received from the wearable device 100' or an external device. Here, the database 210' is an apparatus for storing data and basically stores data such as environmental variables or the like used for search, classification, analysis and the like, and since the functions of the database 210' can be implemented using general techniques, detailed descriptions on the implementation will be omitted.

The server control unit 220' may extract information corresponding to a signal received from the wearable device 100' from the database 210'. For example, if the information received from the wearable device 100' is a signal requesting information on coupons that can be used at the 'Daechi-long branch of store A', the control unit 130' may search for coupons that can be used at the store A and transmit the coupons to the wearable device 100' or a user terminal 400' of a user using an ID the same as that of the wearable device 100'.

The server communication unit 230' may transmit the corresponding information extracted from the database 210' by the server control unit 220' according to a request signal of the wearable device 100' to the wearable device 100' or the user terminal 400' through a communication network. Here, the communication network includes both wired communication and wireless communication, and the wearable device 100' and the product information providing device 200' may be connected to each other through the communication network.

Figure 15:
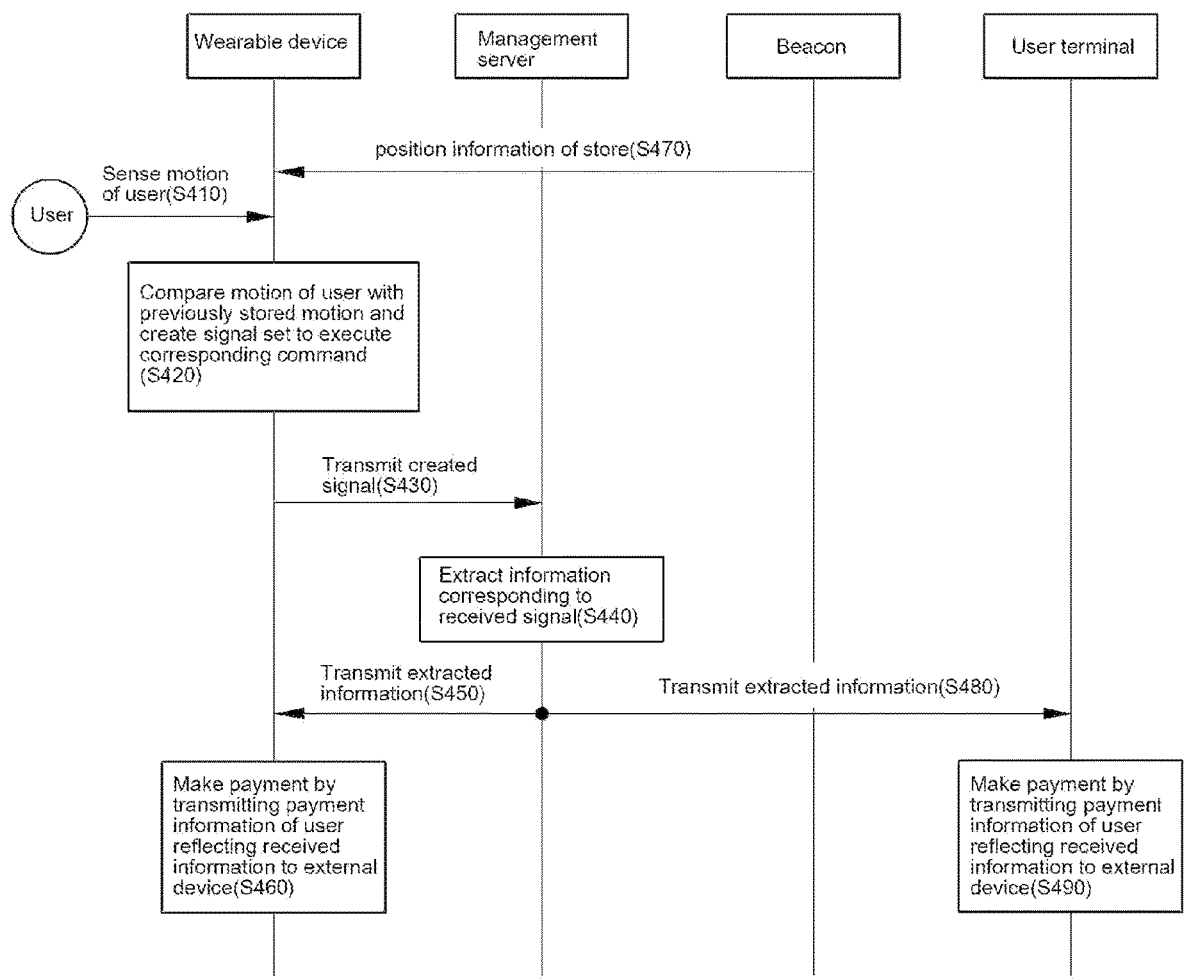
FIG. 15 is a sequence diagram illustrating a method of making a payment by sensing a motion according to an embodiment of the present invention.

FIG. 15 is a view showing the sequence diagram of a method of making a payment by sensing a motion according to an embodiment of the present invention.

Referring to FIG. 15, a method of making a payment by sensing a motion according to an embodiment of the present invention includes the steps of: (a) sensing, by a wearable device, a motion of a user (step S410'); (b) comparing, by the wearable device, the motion of the user with a previously stored motion and creating a signal set to execute a command corresponding to a previously stored payment motion (step S420'); (c) transmitting, by the wearable device, the signal to a product information providing device and receiving, by a management server, the signal (step S430'); (d) extracting, by the product information providing device, information corresponding to the received signal (step S440'); (e) transmitting, by the product information providing device, the extracted information to the wearable device and receiving, by the wearable device, the extracted information (step S450'); and (f) making a payment, by the wearable device, by transmitting payment information of the user reflecting the received information to an external device (step S460').

At step (a) (step S410'), the wearable device 100' analyzes movement of muscles of a user or a specific motion performed by the user using a sensor for sensing a motion of the user. For example, it may be set such that when the user takes a motion of completely folding a thumb, the wearable device senses that the muscles using the thumb of the user are used more than a predetermined strength and turns on the screen, and when the user takes a motion of folding an index finger, the wearable device may transmit payment information of the user to a payment terminal of the store where the user is positioned so that the user may make a payment for a specific product. In addition, when the user takes a motion of folding a middle finger, the wearable device may transmit information on the store where the user is positioned to the product information providing device and receive information on coupons, points or events handled at the store where the user is positioned.

At step (b) (step S420'), the wearable device 100' searches for a matching motion by comparing the motion sensed at step (a) (step S410') with a previously stored motion, and if this is a motion for making a payment by the user, the wearable device 100' may make a payment by transmitting previously stored payment information of the user to the an external device. Here, the payment information includes information selected by the user as a payment means, and for example, when the user make a payment using credit card information, the payment information includes a company, a card number, an expiry date and a CVC number related to the credit card, and it is preferred that the payment information is previously stored in the wearable device 100'.

At step (c) (step S430'), the wearable device 100' for providing coupons and points by sensing a payment motion and the product information providing device 200' may be connected to each other through a communication network, and the communication network includes both wired communication and wireless communication.

At step (d) (step S440'), the product information providing device 200' extracts information corresponding to the signal received from the wearable device 100'. For example, if the information received from the wearable device 100' is a signal requesting information on coupons that can be used at the 'Daechi-dong branch of store A', the product information providing device 200' may search for coupons that can be used at store A and transmit information on the coupons to the wearable device 100' or a user terminal 400' of a user using an ID the same as that of the wearable device 100'.

At step (e) (step S450'), the wearable device 100' for providing coupons and points by sensing a payment motion and the product information providing device 200' may be connected to each other through a communication network, and the communication network includes both wired communication and wireless communication.

At step (f) (step S460'), the wearable device 100' may make a payment by transmitting the payment information of the user reflecting the information on coupons, points or events received from the product information providing device 200' to an external device.

As another embodiment of the present invention, the method of making a payment by sensing a motion according to another embodiment of the present invention may further include, before step (c) (step S430'), the step of receiving, by the wearable device 100', position information of the store from a beacon 300' (step S470'), and at step (c) (step S430'), the received position information of the store is also transmitted to the product information providing device 200'. Meanwhile, the step of receiving position information of the store from the beacon 300' will not be limited between specific steps from the aspect of time series.

Accordingly, when a user of the present invention enters a store in which the beacon 300' is installed, the beacon 300' sends an ID containing information on the position of the store to the wearable device 100', and the wearable device 100' transmits the position information of the corresponding store to the product information providing device 200', and the product information providing device 200' may transmit information on coupons, points or events that can be used by the user at the corresponding store. Therefore, although it is difficult to grasp an indoor position using the GPS, the beacon 300' is advantageous in that information on a store where the user is positioned can be confirmed correctly since the beacon 300' makes it possible to grasp the position of an indoor user positioned within the range of radius.

As another embodiment of the present invention, the method of making a payment by sensing a motion according to another embodiment of the present invention may further include, after step (d) (step S440'), the steps of: (d1) transmitting, by the management server, the extracted information to the user terminal and receiving, by the user terminal, the information (step S480'); and (d2) making, by the user device, a payment by transmitting the payment information of the user reflecting the received information to an external device (step S490'). Therefore, a payment can be made through the user terminal 400 such as a smart phone or the like used by the user himself or herself, as well as the wearable device 100'.

Here, the user terminal 400' includes a Personal Digital Assistant (PDA), a smart phone, a cellular phone, a Personal Communication Service (PCS) phone, a Global System for Mobile (GSM) phone, a Wideband CDMA (W-CDMA) phone, a CDMA-2000 phone, a Mobile Broadband System (MBS) phone and the like which can be applied in a variety of wired and wireless environments. Meanwhile, although the user terminal 400' may represent a small portable device, embodiments of the present invention will not be specially limited thereto since the user terminal can be referred to as a mobile communication terminal if the user terminal includes a camcorder, a laptop computer or the like.

Figure 16:
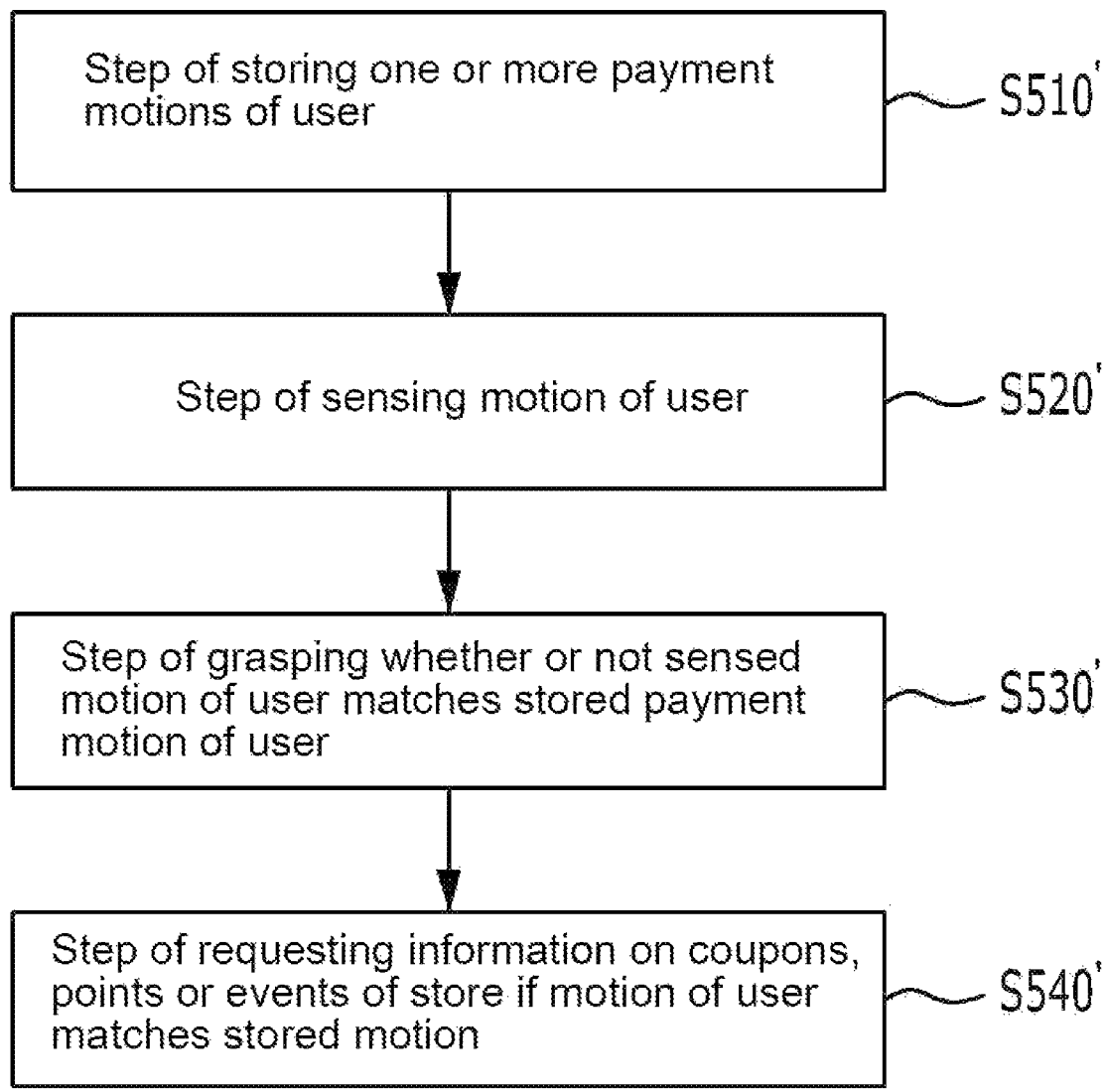
FIG. 16 is a flowchart illustrating a method of providing coupons and points by sensing a payment motion in a wearable device according to an embodiment of the present invention.

FIG. 16 is a view showing the flowchart of a method of making a payment by sensing a motion in a method of making a payment by sensing a motion by a wearable device according to an embodiment of the present invention.

Referring to FIG. 16, in a method of making a payment by sensing a motion by a wearable device, the method of making a payment by sensing a motion according to an embodiment of the present invention includes the steps of: (a) storing one or more payment motions of a user (step S510'); (b) sensing a motion of the user (step S520'); (c) grasping whether or not the sensed motion of the user matches the stored payment motion (step S530'); and (d) requesting, if the sensed motion of the user matches the stored payment motion, information on coupons, points or events that can be used at a store where the user is positioned from a product information providing device (step S540').

At step (b) (step S520'), the wearable device senses a motion of the user, and at this point, the motion includes motions from a minute motion to a big motion of all means of the body of the user. For example, if the wearable device 100' is a smart glass, it may sense specific movements of the eyes of the user as a motion, and if the wearable device 100' is a smart watch or a smart band, it may sense movements of fingers or the palm of the user through muscles or nerves, and if the wearable device 100' is a smart ring put on a finger, it may sense a motion through the change of moving direction and acceleration of the finger when the user takes a motion of drawing a specific picture using the finger. Meanwhile, the embodiments described above are merely examples, and various means, other than these, for sensing a motion of the user can be included.

At this point, as an embodiment of the present invention, at step (b) (step S520'), the wearable device may use an electromyography sensor for sensing an electrical signal of a muscle changing according to a motion of the user. A wearable device 100', such as a smart watch or a smart band put on a part of the body in which muscles briskly move, preferably uses the electromyography sensor. The electromyography sensor may grasp a motion of the user by grasping contraction and relaxation states of muscles of the user.

For example, since the muscles used when the user moves fingers are different from each other, the electromyography sensor may grasp movement of each finger, and since a motion also can be sensed through a combination of the fingers, as the electromyography sensor senses various motions, the control unit 130' described below may issue a command corresponding to the motion.

In addition, as another embodiment of the present invention, at step (b) (step S520'), the wearable device may use an inertial sensor for sensing an acceleration changing according to a motion of the user. The inertial sensor detects an inertial force generated according to the movement of the body after the user wears the wearable device 100' and detects an inertial force acting on an inertial object by measuring an acceleration, i.e., a speed, a direction, a distance or the like, of a body portion moved by the user. The inertial sensor is classified into an accelerometer and a gyroscope, and development of inertial sensors using a laser and non-mechanical type inertial sensors are also under progress.

When such an inertial sensor is used, an example assuming that the wearable device 100' is a smart ring put on a finger can be considered. At this point, when the user takes a motion of drawing a specific picture, the motion can be sensed through change of direction and acceleration.

Step (d) (step S540') may include the steps of: (d1) transmitting, if the sensed motion of the user matches the stored payment motion, the created payment signal to the product information providing device together with GPS information; and (d2) receiving information on coupons, points or events based on the GPS information from the product information providing device. Therefore, in the present invention, a position of a store where a user is positioned can be grasped based on the GPS information, and various kinds of information handled at the corresponding store can be received from the product information providing device 200'.

Figure 17:
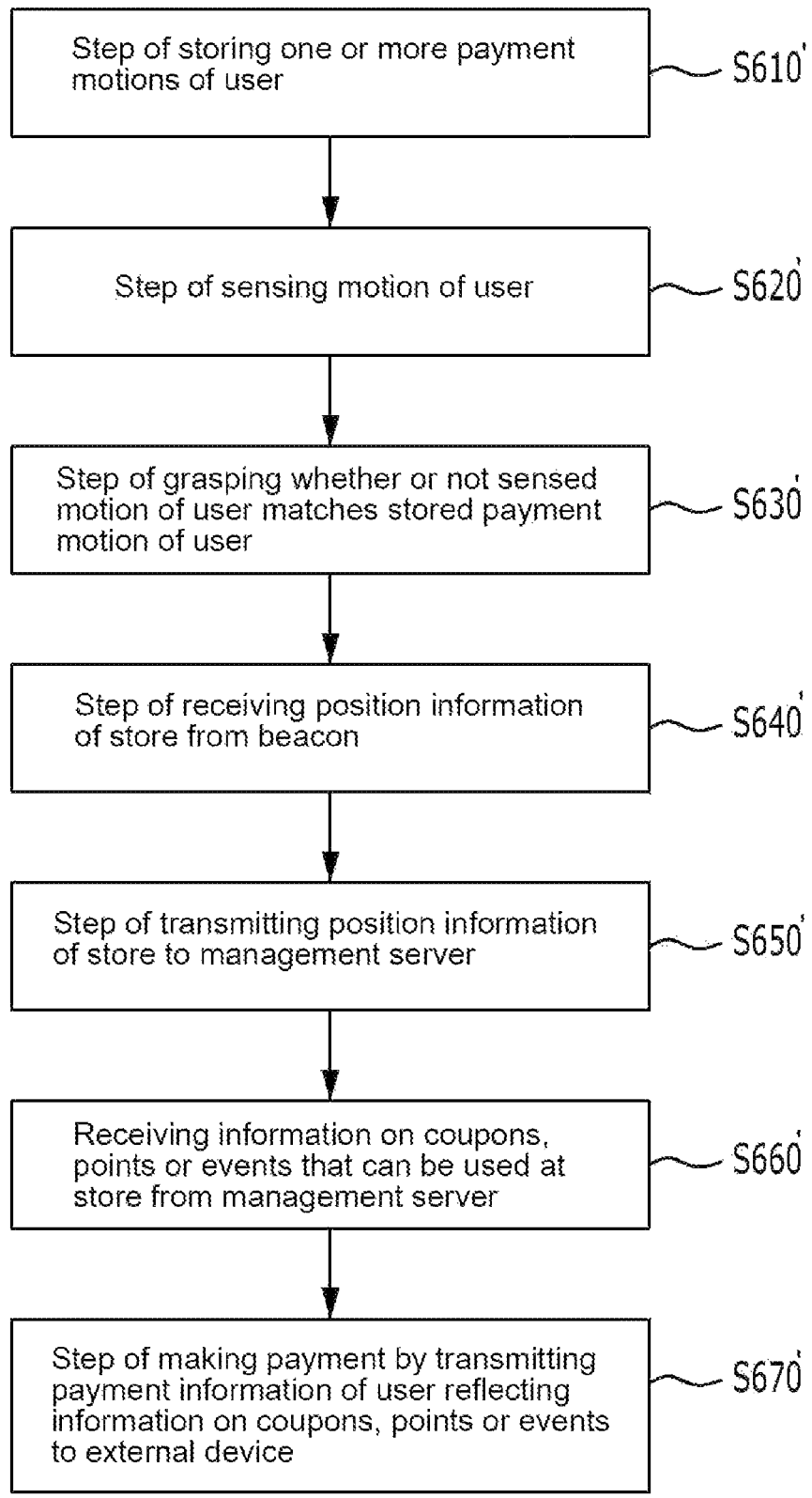
FIG. 17 is a flowchart illustrating a method of providing coupons and points by sensing a payment motion in a wearable device according to another embodiment of the present invention.

FIG. 17 is a view showing the flowchart of a method of making a payment by sensing a motion in a method of making a payment by sensing a motion by a wearable device according to another embodiment of the present invention.

Referring to FIG. 17, a method of making a payment by sensing a motion according to another embodiment of the present invention includes the steps of: (a) storing one or more payment motions of a user (step S610'); (b) sensing a motion of the user (step S620'); (c) grasping whether or not the sensed motion of the user matches the stored payment motion (step S630'); and (d) requesting, if the sensed motion of the user matches the stored payment motion, information on coupons, points or events that can be used at a store where the user is positioned from a product information providing device, and in addition, the method further includes the step of (e) receiving position information of the store from a beacon (step S640'), and step (d) may include the steps of: (d3) transmitting the position information of the store to the product information providing device (step S650'); and (d4) receiving information on coupons, points or events that can be used at the store from the product information providing device (step S660'). Meanwhile, step (e) will not be limited between specific steps from the aspect of time series.

In addition, the method of making a payment by sensing a motion of the present invention may further include, after step (d) (steps S650' and S660'), the step of making a payment by transmitting the payment information of the user reflecting the information on coupons, points or events received from the product information providing device to an external device (step S670').

Accordingly, when a user of the present invention enters a store in which the beacon 300' is installed, the beacon 300' sends an ID containing information on the position of the store to the wearable device 100', and the wearable device 100' transmits the position information of the corresponding store to the product information providing device 200', and the product information providing device 200' may transmit information on coupons, points or events that can be used by the user at the corresponding store.

Figure 18:
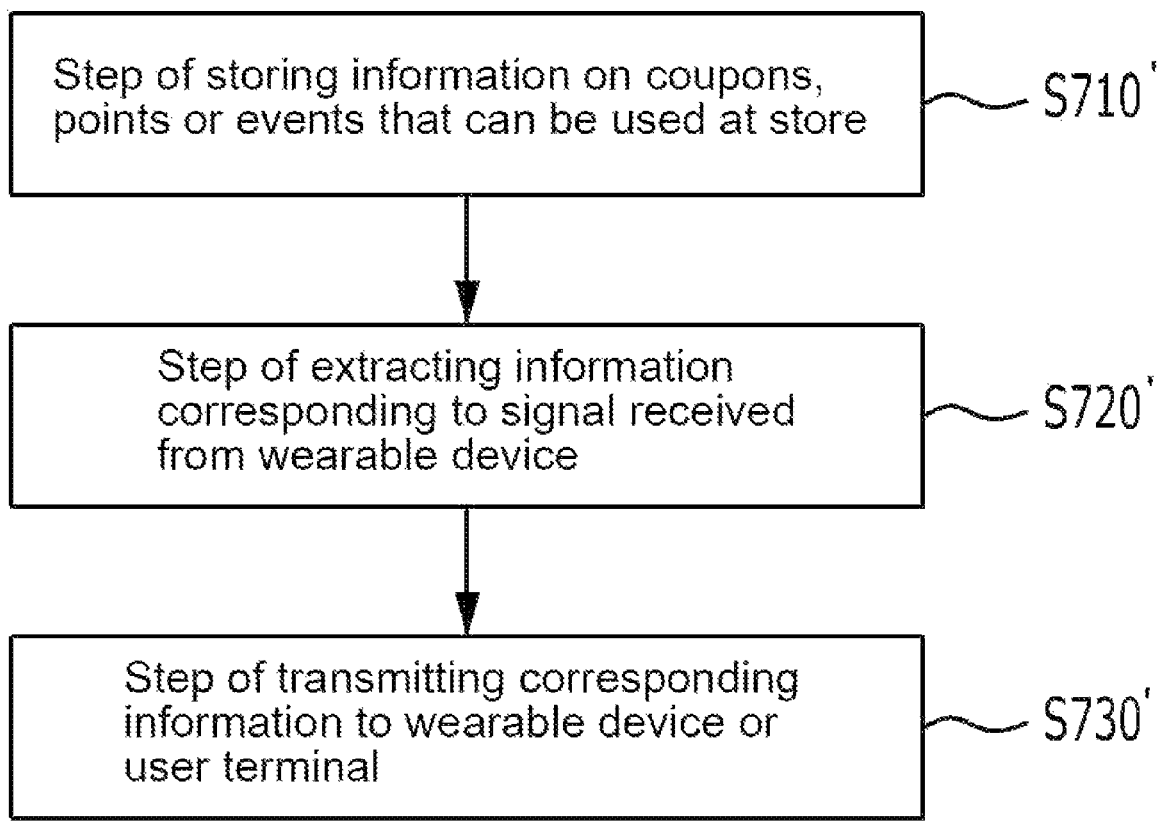
FIG. 18 is a flowchart illustrating a method of providing coupons and points by sensing a payment motion in a product information providing device according to an embodiment of the present invention.

FIG. 18 is a view showing the flowchart of a method of making a payment by sensing a motion in a method of making a payment by sensing a motion by a product information providing device according to an embodiment of the present invention.

Referring to FIG. 18, in a method of making a payment by sensing a motion by a product information providing device, the method of making a payment by sensing a motion according to an embodiment of the present invention includes the steps of: (a) storing information on coupons, points or events that can be used at a store (step S710'); (b) extracting information corresponding to a signal received from a wearable device (step S720'); and (c) transmitting the corresponding information to the wearable device or a user terminal (step S730').

At step (a) (step S710'), the database 210' may receive position information of the user from the wearable device 100' and store various kinds of information that can be used at a store used by the user, such as user information (membership information of the user, frequently used stores, information on a store that has approved inquiry of the user information, etc.), information on coupons that can be used at a specific store, information on point accumulation of the user at each store, information on events progressed at a store and the like, and the database 210' may update information if new information is received from the wearable device 100' or an external device. Here, the database 210' is an apparatus for storing data and basically stores data such as environmental variables or the like used for search, classification, analysis and the like, and since the functions of the database 210' can be implemented using general techniques, detailed descriptions on the implementation will be omitted.

At step (b) (step S720'), the product information providing device 200' may extract information corresponding to the signal received from the wearable device 100', and for example, if the information received from the wearable device 100' is a signal requesting information on coupons that can be used at the 'Daechi-long branch of store A', the control unit 130' may search for coupons that can be used at store A and transmit information on the coupons to the wearable device 100' or a user terminal 400' of a user using an ID the same as that of the wearable device 100'.

At step (c) (step S730'), the product information providing device 200' may transmit the corresponding information extracted from the database 210' by the server control unit 220' according to a request signal of the wearable device 100' to the wearable device 100' or the user terminal 400' through a communication network. Here, the communication network includes both wired communication and wireless communication, and the wearable device 100' and the product information providing device 200' may be connected to each other through the communication network.

Figure 19:
FIG. 19 is a view showing a system for providing benefit information for an interested product according to an embodiment of the present invention.
Figure 20:
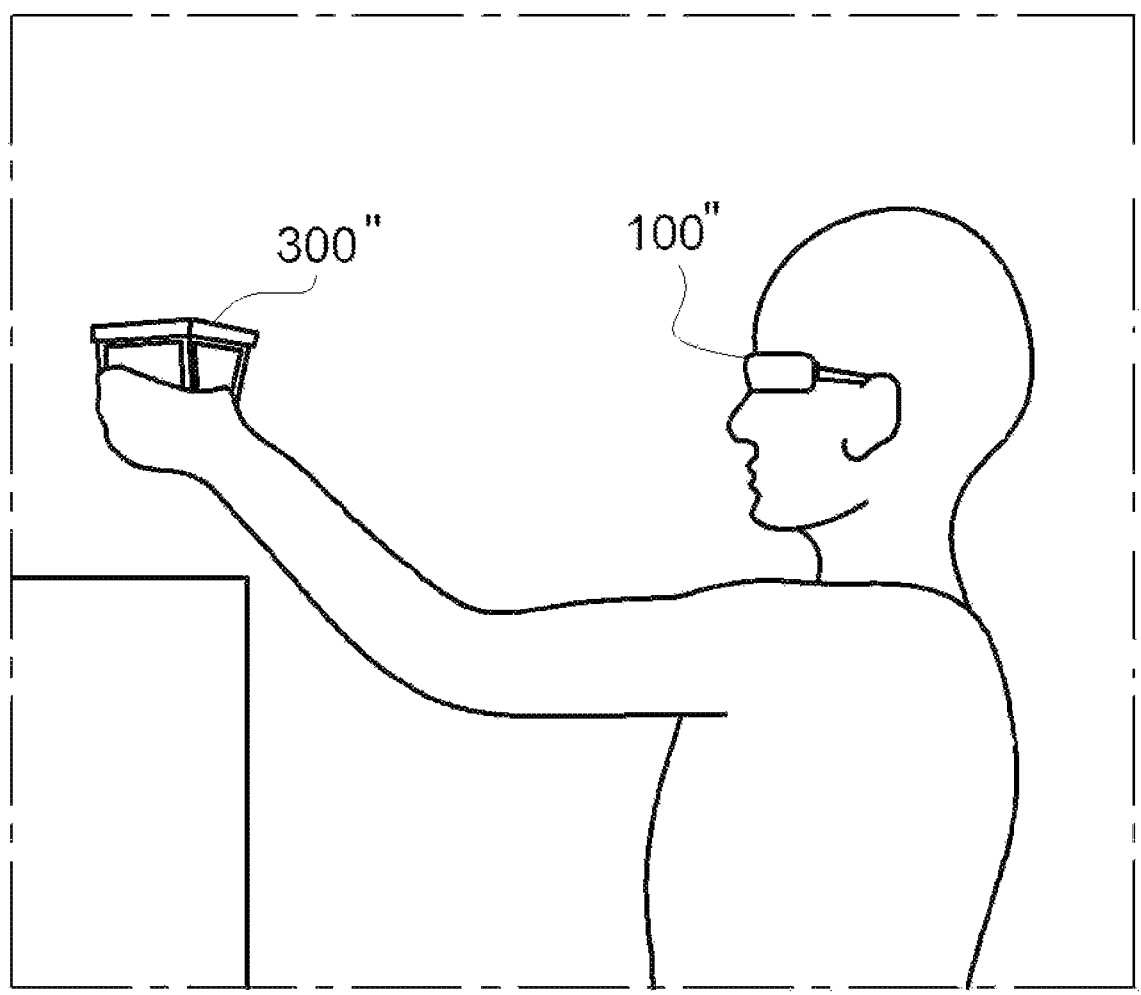
FIG. 20 is a view showing an example of implementing a wearable device as a smart glass according to an embodiment of the present invention.
Figure 21:
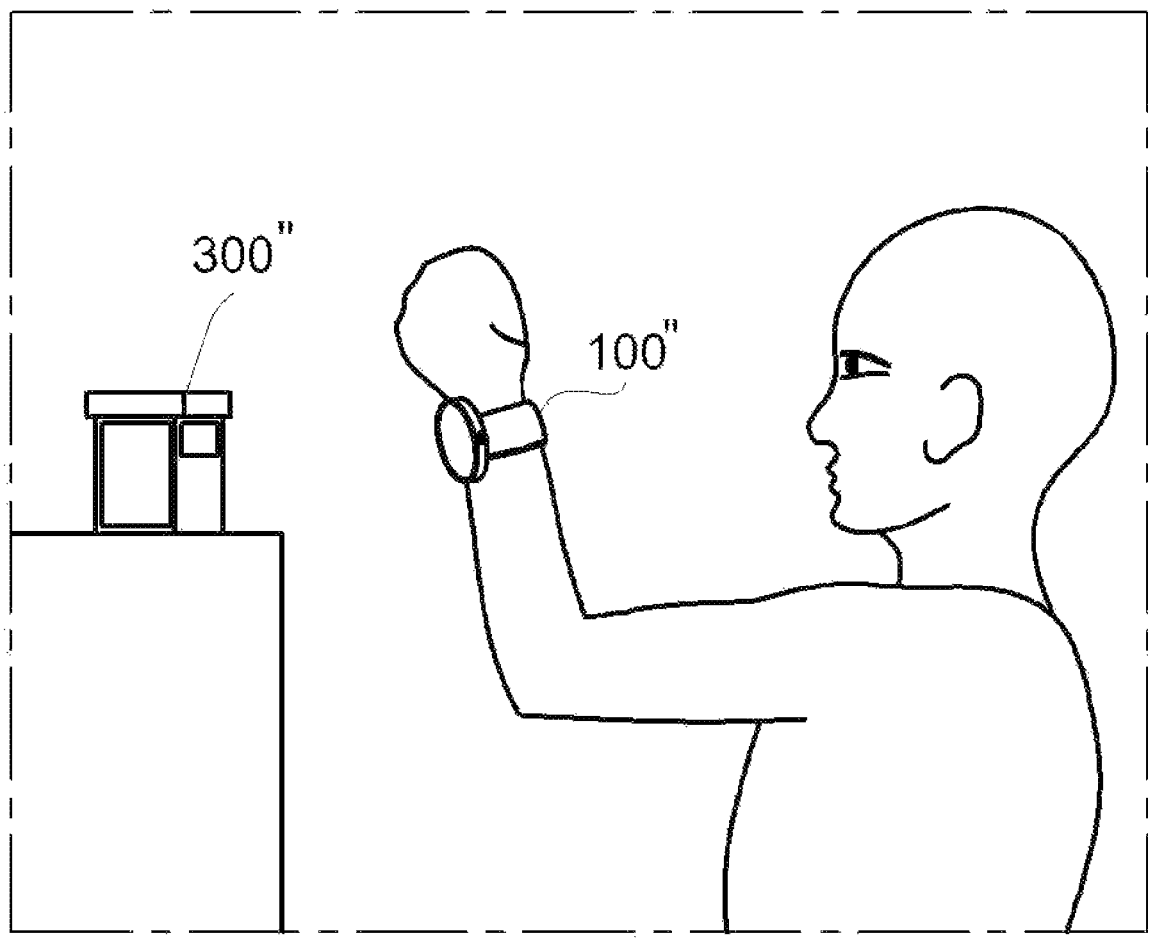
FIG. 21 is a view showing an example of implementing a wearable device as a smart watch according to an embodiment of the present invention.

FIG. 19 is a view showing a system for providing benefit information for an interested product according to an embodiment of the present invention, FIG. 20 is a view showing an example of implementing a wearable device as a smart glass according to an embodiment of the present invention, and FIG. 21 is a view showing an example of implementing a wearable device as a smart watch according to an embodiment of the present invention.

Referring to FIG. 19, a system for providing benefit information for an interested product includes a wearable device 100" and a product information providing device 200", and they are connected through a communication network.

The wearable device 100" displays an image corresponding to a view of a user on a screen, and if the user performs a preset motion, the wearable device 100" identifies an object from the displayed image, registers the identified object as an interested product, and receives benefit information corresponding to a category where the interested product belongs to from the product information providing device 200". Here, the preset motion is, for example, a motion of picking up an object, and the wearable device 100" is provided with a function of sensing a motion of the user and determines whether or not the sensed motion is a preset motion.

According to the type of the wearable device 100", the wearable device 100" uses a different method of sensing a motion of the user. If the wearable device 100" is a smart glass, movement of the eyes of the user may be sensed as a motion, and if the wearable device 100" is a smart watch or a smart band, movement of the body (e.g., an arm or a hand) of the user may be sensed as a motion. Meanwhile, the embodiments described above are merely examples, and various means, other than these, for sensing a motion of the user can be included.

In addition, the wearable device 100" used in the present invention is provided with a photographing function and acquires an image corresponding to a view of the user.

An application (or an applet) capable of performing a benefit information providing service for an interested product can be stored in the wearable device 100", and benefit information provided by the product information providing device 200" can be output through the application.

Here, the wearable device 100" may be any one of a smart watch, a smart glass and a smart band. First, it will be described focusing on the case where the wearable device 100" is a smart glass.

A user wears a smart glass on the face and performs a motion such as purchasing a product, eye shopping or the like in an offline space. At this point, the user wears the smart glass so that the smart glass may exactly face the front side and accurately recognize a product image. For example, as shown in FIG. 21, if a user wearing a smart glass 100" picks up a product 300", the smart glass 100" displays the product 300" picked up by the user on the screen, and if the exposure time of the displayed product is longer than a preset time, the smart glass 100" registers the picked up product 300" as an interested product, receives benefit information corresponding to a category where the interested product belongs to, and displays the benefit information on the screen.

Such a wearable device 100" will be described in detail with reference to FIG. 22.

If information on an interested product is received from the wearable device 100", the product information providing device 200" determines a category of the interested product and provides the wearable device 100" with benefit information of the products belonging to the category. Here, the category may be a category of a brand, a manufacturer, a type or the like, and the benefit information may be a coupon, a discount, a membership service, product information or the like, and the product information may include a product name, a store name, a store location, a store phone number, a store description and the like. For example, if 'Product A' is a one-piece suit (clothes) of brand A, the product information providing device 200" may determine the category of 'Product A' as 'Brand A' or 'One-piece' and provide benefit information of the products belonging to the category of 'Brand A' or provide benefit information of the products belonging to the category of 'One-piece'.

On the other hand, the product information providing device 200" may be implemented as a single arithmetic unit or may be implemented in the form of an aggregated device connecting two or more arithmetic units.

The product information providing device 200" will be described in detail with reference to FIG. 23.

In the above descriptions, the wearable device 100" is provided with a display unit and may display an image photographed by the wearable device 100", benefit information transmitted from the product information providing device 200" and the like. However, the wearable device 100" may not be provided with a display unit. In this case, the interested product information providing system may further include a user device (not shown).

As another embodiment of the present invention, the system for providing benefit information for an interested product may further include a user device (not shown) for storing and outputting an image photographed by the wearable device 100", benefit information transmitted from the product information providing device 200" and the like. At this point, the wearable device 100" and the user device may be paired with each other through short-range wireless communication.

The wearable device 100" may transmit a photographed image and benefit information transmitted from the product information providing device 200" to a user device (e.g., a smart phone) paired with the wearable device 100". For example, the wearable device 100" may transmit and receive data using a short-range communication network such as NFC or Bluetooth. At this point, the wearable device 100" may transmit interested product information from the user device to the product information providing device 200" through the short-range communication network. The wearable device 100" may receive benefit information of the interested product created by the product information providing device 200" from the product information providing device 200" and transmit the received benefit information of the interested product from the wearable device 100" to the user device.

The user device includes a Personal Digital Assistant (PDA), a smart phone, a cellular phone, a Personal Communication Service (PCS) phone, a Global System for Mobile (GSM) phone, a Wideband CDMA (W-CDMA) phone, a CDMA-2000 phone, a Mobile Broadband System (MBS) phone and the like which can be applied in a variety of wired and wireless environments. Here, although the user device may represent a small portable device, embodiments of the present invention will not be specially limited thereto since the user terminal can be referred to as a mobile communication terminal if the user terminal includes a camcorder, a laptop computer or the like.

Meanwhile, the wearable device 100" for providing benefit information service for an interested product according to an embodiment of the present invention may be implemented through a smart watch, a smart band or the like, as well as the smart glass described above. Hereinafter, a difference of implementing the wearable device 100″ through a smart watch, a smart band or the like, not the smart glass, will be described.

When the wearable device 100″ for providing benefit information service for an interested product is implemented through a smart watch, although the user looks at with eyes a product that the user is interested in, it is difficult for the smart watch to recognize whether or not the product is an interested product as is in the case of a smart glass since the smart watch is put on the wrist of the user. Accordingly, although the functions of the smart watch are the same as those of the smart glass, it is preferable to set an image acquisition unit (e.g., a camera) of the smart watch 100″ to face an interested product 300″ as shown in FIG. 21 and recognize the interested product 300″ using an image acquired through the image acquisition unit when the user performs a preset motion. In the case of a smart watch, the size of the display unit is limited by the nature of a device such as a watch. In this case, although an image corresponding to a view of the user is acquired through the smart watch, the displayed information may be output through a smart glass or a user device.

On the other hand, in the case of a smart band, although the user looks at with eyes a product that the user is interested in, it is difficult for the smart band to recognize whether or not the product is an interested product as is in the case of a smart glass since the smart band is also put on the wrist of the user like the smart watch. Accordingly, it is preferable to set an image acquisition unit to face a product like the smart watch and recognize the product using an image acquired through the image acquisition unit when the user performs a preset motion. In addition, since most of smart bands do not have a display unit, there is no way but to provide a photographed image in association with other devices. Here, the other devices may be a wearable device such as a smart watch or a smart glass, or any other devices including a display unit will do although it is nota wearable device.

Figure 22:
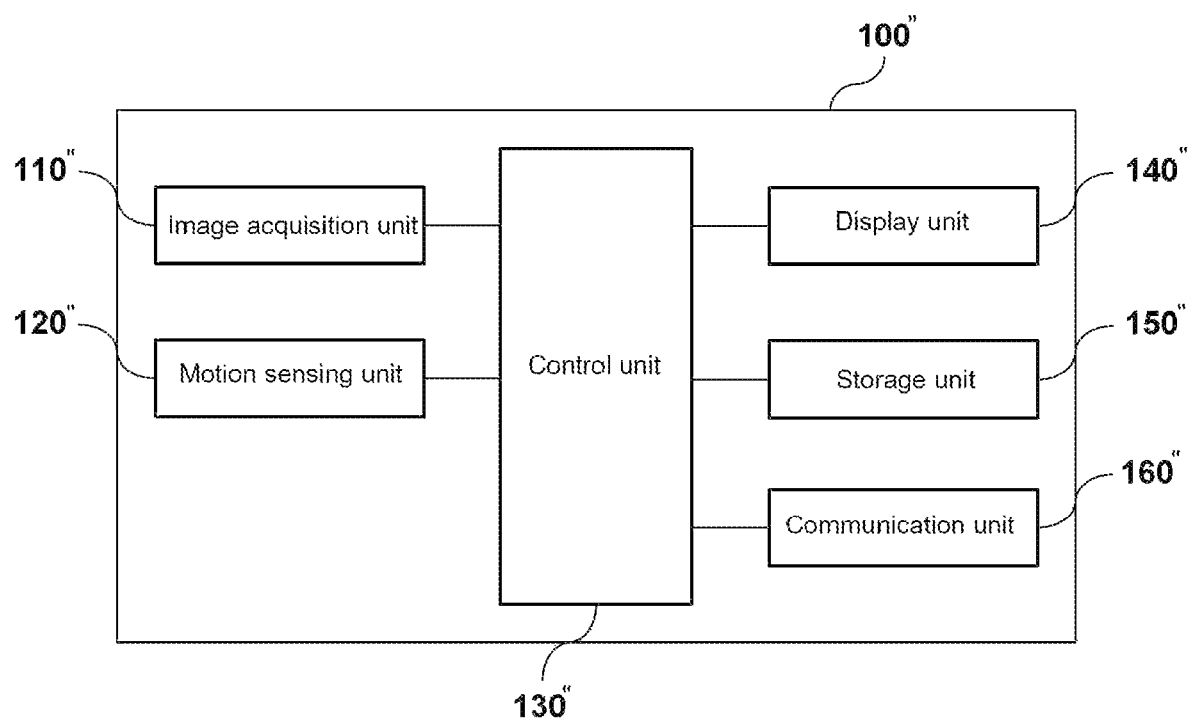
FIG. 22 is a block diagram schematically showing the configuration of a wearable device according to an embodiment of the present invention.

FIG. 22 is a block diagram schematically showing the configuration of a wearable device according to an embodiment of the present invention.

Referring to FIG. 22, a wearable device 100″ includes an image acquisition unit 110″, a motion sensing unit 120″, a control unit 130″, a display unit 140″, a storage unit 150″ and a communication unit 160″, and apparently, other configurations needed to accomplish other objects of the present invention can be added.

The image acquisition unit 110″ is a configuration for acquiring an image corresponding to a view of a user and may be, for example, a camera.

The image acquisition unit 110″ may photograph an image on the front side, which is recognized by the sense of sight of the user in accordance with the eyeline of the user wearing the wearable device 100″.

In addition, if a motion of the user sensed by the motion sensing unit 120″ matches a preset motion, the image acquisition unit 110″ may recognize and photograph an object. Here, the preset motion may be a motion of picking up an object (e.g., a product).

The image acquisition unit 110″ is implemented as an image acquisition means such as a camera and acquires an image of a product that the user is interested in as an image signal. In some cases, the image acquisition unit 110″ may be provided with a plurality of cameras and acquire an eyeball image of the user, as well as an image of a product that the user is looking at. The eyeball image of the user is acquired to determine which area the user intensively observes among the surrounding environments. Meanwhile, the image acquired by an image sensor of the image acquisition unit 110″ in the photographing mode may be displayed through the display unit 140'.

The motion sensing unit 120″ senses a motion of a user wearing the wearable device 100″. Here, the motion of a user may include the eyeline of the user gazing at an object (a product) or a motion performed on the product (e.g., a motion of picking up the object) that the user is gazing at.

According to the type of the wearable device 100″, the motion sensing unit 120″ uses a different method of sensing a motion of the user.

For example, if the wearable device 100″ is a smart glass, the motion sensing unit 120″ may sense movement of the eyes of the user as a motion. At this point, the motion sensing unit 120″ may be a sensor provided along the center of the frame of the display unit 140″ to trace and recognize the eyeline of the user. In addition, the motion sensing unit 120″ may not be provided along the frame of the display unit 140″ and can be mounted at any portion if it is a certain position in the display unit 140″ which can easily trace the eyeline of the user.

In addition, if the wearable device 100″ is a smart watch or a smart band, the motion sensing unit 120″ may sense movement of the body (e.g., an arm or a hand) of the user as a motion. At this point, the motion sensing unit 120″ may be implemented in a variety of motion recognition sensors such as an electromyography sensor for sensing an electrical signal of a muscle changing according to a motion of the user, an inertial sensor for sensing an acceleration changing according to a motion of the user and the like. The electromyography sensor may determine a motion of the user by grasping contraction and relaxation states of muscles of the user. For example, since the muscles used when the user moves an arm or a hand are different from each other, the electromyography sensor may grasp movement of the arm or the hand and sense a motion of the user through the movement of the arm or the hand. The inertial sensor detects an inertial force generated according to the movement of an arm or a hand and detects an inertial force acting on an inertial object by measuring an acceleration, i.e., a speed, a direction, a distance or the like, of a body portion moved by the user.

The display unit 140″ displays the image acquired by the image acquisition unit 110″.

In addition, the display unit 140″ may display benefit information received from the product information providing device through the communication unit 160″.

Such a display unit 140″ may be configured to include a transparent or light transmissive unit so that the user may see the front view spread ahead, together with the information displayed by the wearable device 100″. The display unit 140″ may be implemented using a transparent display method such as a Head Mounted Display (HMD), a Head Up Display (HUD) or a Transparent OLED (TOLED) so that the user may visually recognize an object displayed through the display unit 140″, together with the front view spread ahead. In addition, the display unit 140″ is provided with a glass screen or the like at a location the same as that of a smart glass lens, in addition to the frame of the smart glass.

If the motion of the user sensed by the motion sensing unit 120″ is a preset motion, the control unit 130″ identifies an object from the image displayed on the display unit 140″, registers the identified object as an interested product, and receives benefit information corresponding to a category where the interested product belongs to.

That is, the control unit 130" determines whether or not the motion of the user sensed by the motion sensing unit 120"" is a motion of picking up an object. At this point, according to the type of the wearable device 100", the control unit 130" uses a different method of determining whether or not the motion of the user is a motion of picking up an object.

For example, if the wearable device 100" is a smart glass, the control unit 130" may determine that the user performs a motion of picking up an object if there is no change in the movement of the eyeline sensed by the motion sensing unit 120". In this case, if the user sees the object with interest, there is no change in the movement of pupils, and thus the control unit 130" may determine that the user performs a motion of picking up an object if there is no change in the movement of the eyeline. In addition, the control unit 130" measures a distance between a real object focused by the eyeline sensed by the motion sensing unit 120" and the object displayed on the display unit 140", and if the measured distance is within a predetermined distance, the control unit 130" may determine that the user performs a motion of picking up the object. At this point, in order to measure the distance between the objects, various conventional techniques such as a distance measurement algorithm and the like can be used. The predetermined distance may be an average distance or the like between the eyes of the user and an object when the user picks up the object.

In addition, if the wearable device 100" is a smart watch or a smart band, the control unit 130" may determine whether or not movement of an arm or a hand sensed by the motion sensing unit 120" is a motion of picking up an object displayed on the display unit 140". For example, since the muscles used when the user moves an arm and a finger are different from each other, the motion recognition sensors may grasp movement of the arm and the finger, and the motion of the user may be determined as a motion of picking up an object through the movement of the arm and the finger.

If the motion of the user is a motion of picking up an object, the control unit 130" identifies the object from the image displayed on the display unit 140". At this point, the control unit 130" may identify the object by using a method using a difference image, a meanshift and application method, a local binary pattern method or the like. In addition, the control unit 130" detects major areas containing an object and blank areas which are not a major area by analyzing the image displayed on the display unit 140". The control unit 130" may detect the object contained in the image in a variety of conventional methods.

If an object is identified from the image, the control unit 130" registers the object as an interested product and receives benefit information corresponding to a category where the interested product belongs to. That is, if an object is identified from the image, the control unit 130" extracts product identification information which can specify the object (a product) by analyzing the identified object image. At this point, the control unit 130" may extract the product identification information by using a variety of image analysis logic such as an Optical Character Reader (OCR) technique or the like, and the product identification information is a medium containing information which can specify the product and includes a product name printed on the wrap of the product, an image of the product or a product package, a Quick Response (QR) code, a bar code, a logo, a label, a brand, a manufacturer, a type and the like. Then, control unit 130" transmits interested product information including the product identification information to the product information providing device and receives benefit information corresponding to a category where the corresponding product belongs to from the product information providing device. At this point, the control unit 130" receives benefit information of the products belonging to at least any one of categories among the brand, the manufacturer and the type the same as that of the corresponding product. Here, the benefit information may include a coupon, a discount, a membership service, product information and the like.

For example, if an image acquired through the image acquisition unit 110" includes 'Product A' and the product identification information of 'Product A' includes 'Product A', 'Brand A', 'Blouse' and the like, the control unit 130" may receive benefit information of the products belonging to category 'Brand A' or benefit information of the products belonging to category 'Top' including Blouse.

In the above descriptions, although the control unit 130" extracts product identification information which can specify an object (a product) by analyzing an identified object image, the control unit 130" may transmit the object image as is to the product information providing device without extracting the product identification information by analyzing the object image. In this case, the control unit 130" may transmit an image including an object and receive benefit information corresponding to a category where the corresponding product belongs to from the product information providing device.

According to another embodiment of the present invention, the control unit 130" may measure an exposure time of the object displayed on the display unit 140" as soon as a motion of the user is determined as a motion of picking up the object, and if the measured exposure time is longer than a preset time, the control unit 130" may register the identified object as an interested product. If the user holds the product only for an extremely short time (e.g., one second) and puts it back to its original place, it probably may not be an interested product, and thus the control unit 130" may measure an exposure time of the object as soon as the user performs a motion of picking up the object and register the object as an interested product only when the exposure time is longer than a preset time.

The control unit 130" extracts product identification information which can specify an object (a product) exposed on the display unit 140" more than a preset time by analyzing the object image. At this point, the control unit 130" may extract the product identification information by using a variety of image analysis logic. Then, the control unit 130" transmits interested product information including the exposure time and the product identification information to the product information providing device and receives benefit information of the products corresponding to a category where the corresponding product belongs to from the product information providing device. In addition, the control unit 130" may transmit an object image exposed more than a preset time to the product information providing device as is without extracting the product identification information by analyzing the object image. In this case, the control unit 130" transmits interested product information including the exposure time and the product identification information to the product information providing device and receives benefit information of the products corresponding to a category where the corresponding product belongs to from the product information providing device.

The control unit 130" may store an application (or an applet) capable of performing a benefit information providing service for the interested product and control to output benefit information provided by a service server by driving the application.

The control unit 160 is a configuration for controlling operation of various constitutional components of the wearable device 100" including the image acquisition unit 110", the motion sensing unit 120", the display unit 140", the storage unit 150" and the communication unit 160".

Such a control unit 130" may include at least one arithmetic unit, and, here, the arithmetic unit may be a general-purpose central processing unit (CPU), a programmable device element (CPLD or FPGA) implemented to be suitable for a specific purpose, an application specific integrated circuit (ASIC) or a microcontroller chip.

The storage unit 150" is a configuration for storing data related to operation of the wearable device 100". Here, the storage unit 150" may use a publicized storage medium and may use one or more of publicized storage media such as ROM, PROM, EPROM, EEPROM, RAM and the like. Particularly, interested product information, benefit information and the like are stored in the storage unit 150".

An application (or an applet) or the like capable of performing a benefit information providing service for the interested products integrated and managed by the control unit 130" can be stored in the storage unit 150", and the stored information can be selected by the control unit 130" as needed.

The communication unit 160" is a configuration for exchanging data with various electronic devices. Particularly, the communication unit 160" can be connected two or more devices and transmit and receive various kinds of information such as interested product information, benefit information and the like.

In addition, the wearable device 100" according to the present invention may further include a power supply unit (not shown) for supplying power. In addition, the wearable device 100" of the present invention may further include a short-range communication unit (not shown) for performing short-range wireless communication with a user terminal possessed by a user. The short-range communication unit may operate according to various specifications such as Wi-Fi, Bluetooth communication, Zigbee communication, infrared communication (IrDA), Radio Frequency (RF) communication including Ultra High Frequency (UHF) communication and Very High Frequency (VHF) communication, Ultra Wide Band (UWB) communication and the like.

Figure 23:
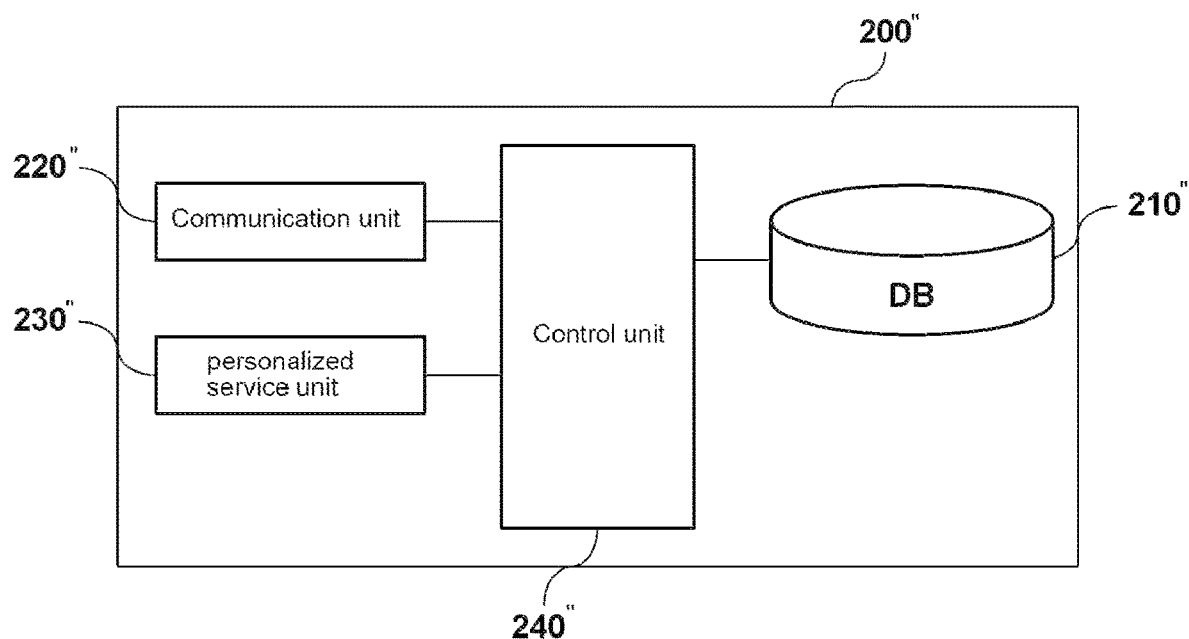
FIG. 23 is a block diagram schematically showing the configuration of a product information providing device according to an embodiment of the present invention.

FIG. 23 is a block diagram schematically showing the configuration of a product information providing device according to an embodiment of the present invention.

Referring to FIG. 23, a product information providing device 200" includes a database 210", a communication unit 220", a personalized service unit 230" and a control unit 240'.

The communication unit 220" may receive interested product information from a wearable device through a communication network and transmit benefit information created by the personalized service unit 230" to the wearable device. Here, the communication network includes both wired communication and wireless communication, and the wearable device and the product information providing device 200" may be connected to each other through the communication network.

Such a data communication unit 220" may include a variety of wired or wireless communication modules and transmit and receive data according to various wireless or wired communication specifications. For example, the data communication unit 220" can be implemented in a form including various standard communication modules of ITU, IEEE, ISO, IEC and the like or in a form including a variety of communication modules other than the standard communication modules.

The database 210" includes a product database and a user database.

The product database stores product related information includes a product name, a product image, an image of the product package, a Quick Response (QR) code, a bar code, a logo, a label, a brand, a manufacturer, a category and the like. At this point, the product database is classified by category, and product information is stored by the category. Here, the category is based on a brand, a type and the like, and the brand may be a form such as Brand A, Brand B, Brand C and the like, and the type may be a form such as clothes, healthy food, cooked food, household items and the like.

In addition, the product database stores a variety of benefit information such as a coupon, a discount, a membership service and the like of each product.

The user database stores user information, interested product information, preferred brands, preferred products, information on product purchase description and the like, and the user information may include a user name, an address, a phone number and the like.

These databases 210" can be implemented to meet the objects of the present invention using a relational database management system (RDBMS) such as Oracle, Infomix, Sybase, DB2 or the like or an object-oriented database management system (OODBMS) such as Gemston, Orion, O2 or the like and may include appropriate fields to accomplish their functions.

Although it is shown in the figure that the database 210" is included in the product information providing device 200", the database 210" may be configured to be separate from the product information providing device 200" according to the needs of those skilled in the art implementing the present invention.

If interested product information is received from the wearable device through the communication unit 220", the personalized service unit 230" determines a category where an interested product belongs to and provides the wearable device with benefit information of the products belonging to the category. The interested product information may include product identification information, an exposure time, an object image and the like, and the personalized service unit 230" may determine a brand or a type of a corresponding product, a preferred brand of a corresponding product and the like as the category of the product.

If interested product information including product identification information is received from the wearable device, the personalized service unit 230" searches the product database and confirms a category where the product identification information belongs to. For example, if the product identification information includes a product name such as 'Product A', the personalized service unit 230" searches the product database and confirms a brand ('Brand A') or a type ('Clothes') that 'Product A' belongs to and may determine the confirmed 'Brand A' or 'Clothes' as the category of 'Product A'. In addition, if the product identification information includes Bar code B, the personalized service unit 230" searches the product database and confirms a brand ('Brand B') or a type ('Healthy food') where 'Bar code B' belongs to and may determine the confirmed 'Brand B' or 'Healthy food' as the category of 'Product B'.

Then, the personalized service unit 230" provides the wearable device with benefit information of the products belonging to the confirmed category. That is, the personalized service unit 230" confirms products for which benefits such as a coupon, a discount, a membership and the like are provided among the products belonging to the confirmed category and provides the wearable device with benefit information of the products. For example, if 'Product A' is a blouse of brand A, the personalized service unit 230" may determine 'Brand A' or 'Top (Clothes)' as the category of 'Product A' and provide benefit information of the products belonging to category 'Brand A' or benefit information of the products belonging to category 'Top (Clothes)'.

In addition, if interested product information including product identification information is received, the personalized service unit 230" may search the user database and confirm a preferred brand for a product corresponding to the product identification information, acquire benefit information of the products belonging to the confirmed preferred brand and provide the benefit information to the wearable device.

In addition, if interested product information including an object image is received, the personalized service unit 230" extracts product identification information which can specify an object (a product) by analyzing the object image. At this point, the personalized service unit 230" may extract product identification information by using a variety of image analysis logic such as an Optical Character Reader (OCR) technique or the like, and the product identification information is a medium containing information which can specify the product and includes a product name printed on the wrap of the product, an image of the product or a product package, a Quick Response (QR) code, a bar code, a logo, a label, a brand, a manufacturer, a type and the like. Then, the personalized service unit 230" searches the product database, confirms a category where the product identification information belongs to, and provides the wearable device with benefit information of the products belonging to the confirmed category.

According to another embodiment of the present invention, the personalized service unit 230" may register interested products of the user based on product purchase description registered in the user database. Then, if benefits such as a discount, a coupon and the like for the products registered as an interested product are registered, the personalized service unit 230" may inform the user of benefit information of the interested products. In addition, the personalized service unit 230" may confirm a category including the products registered as an interested product and inform the user of the benefit information of the products belonging to the confirmed category.

Meanwhile, the personalized service unit 230" may be implemented by a processor or the like needed to execute a program on a computing device. Like this, the personalized service unit 230" may be implemented by a physically independent configuration or implemented in a form functionally separated within a processor.

The control unit 240' is a configuration for controlling operation of various constitutional components of the product information providing device 200" including the communication unit 220", the database 210" and the personalized service unit 230".

Such a control unit 240' may include at least one arithmetic unit, and, here, the arithmetic unit may be a general-purpose central processing unit (CPU), a programmable device element (CPLD or FPGA) implemented to be suitable for a specific purpose, an application specific integrated circuit (ASIC) or a microcontroller chip.

Figure 24:
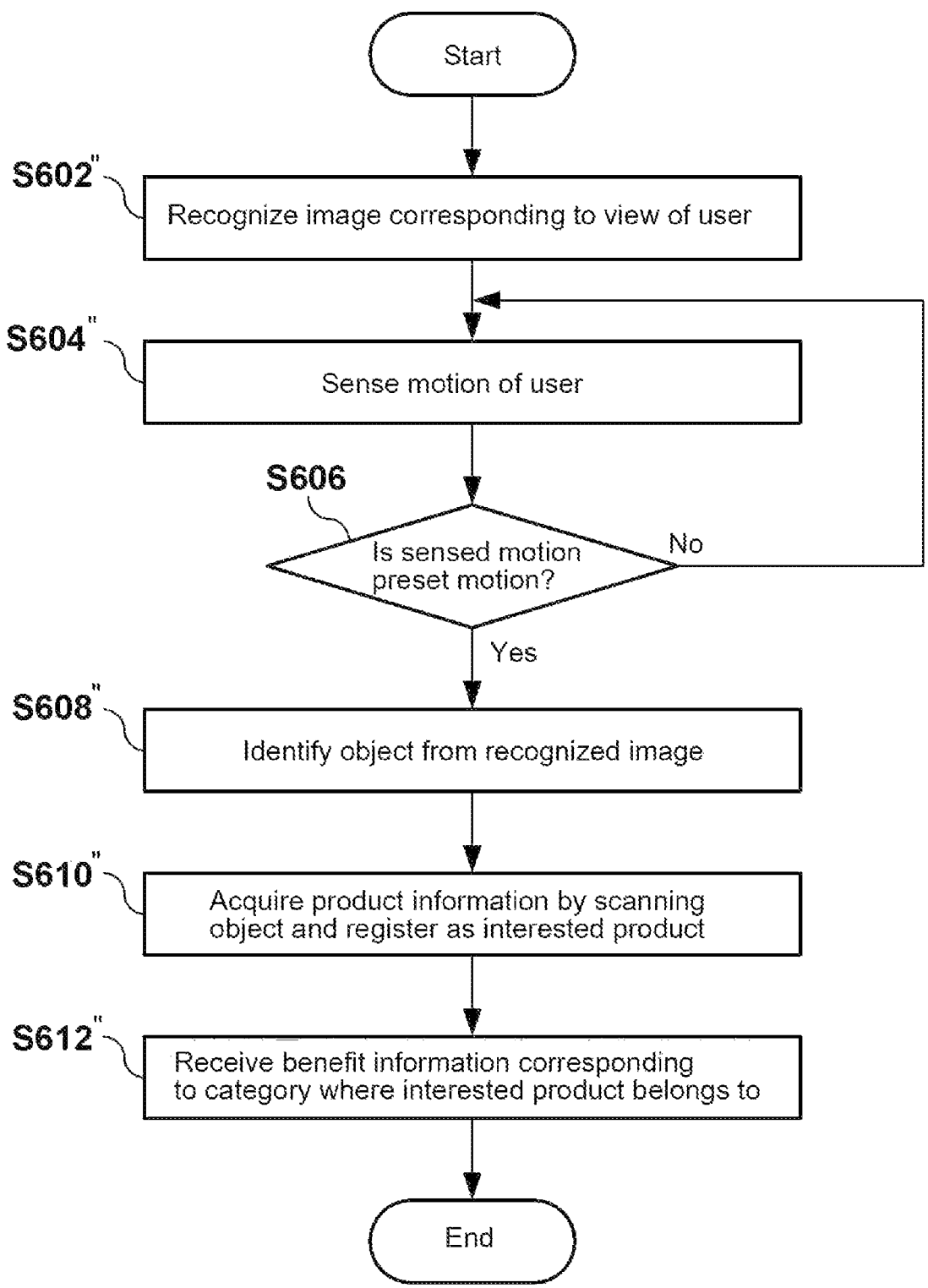
FIG. 24 is a flowchart illustrating a method of receiving benefit information for an interested product by a wearable device according to another embodiment of the present invention.

FIG. 24 is a flowchart illustrating a method of receiving benefit information for an interested product by a wearable device according to another embodiment of the present invention.

Referring to FIG. 24, a wearable device recognizes an image corresponding to a view of a user (step S602), senses a motion of the user (step S604) and determines whether or not the sensed motion of the user is a preset motion (step S606). Here, the preset motion may be a motion of picking up an object by the user.

If the sensed motion of the user is a preset motion as a result of the determination at step S606, the wearable device identifies an object from the recognized image (step S608) and registers the identified object as an interested product (step S610). At this point, the wearable device may identify the object by using a method using a difference image, a meanshift and application method, a local binary pattern method or the like. If an object is identified, the wearable device measures an exposure time of the identified object, and if the measured exposure time is longer than a preset time, the wearable device may register the object as an interested product.

After performing step S610, the wearable device receives benefit information corresponding to a category where the interested product belongs to from the product information providing device (step S612).

Figure 25:
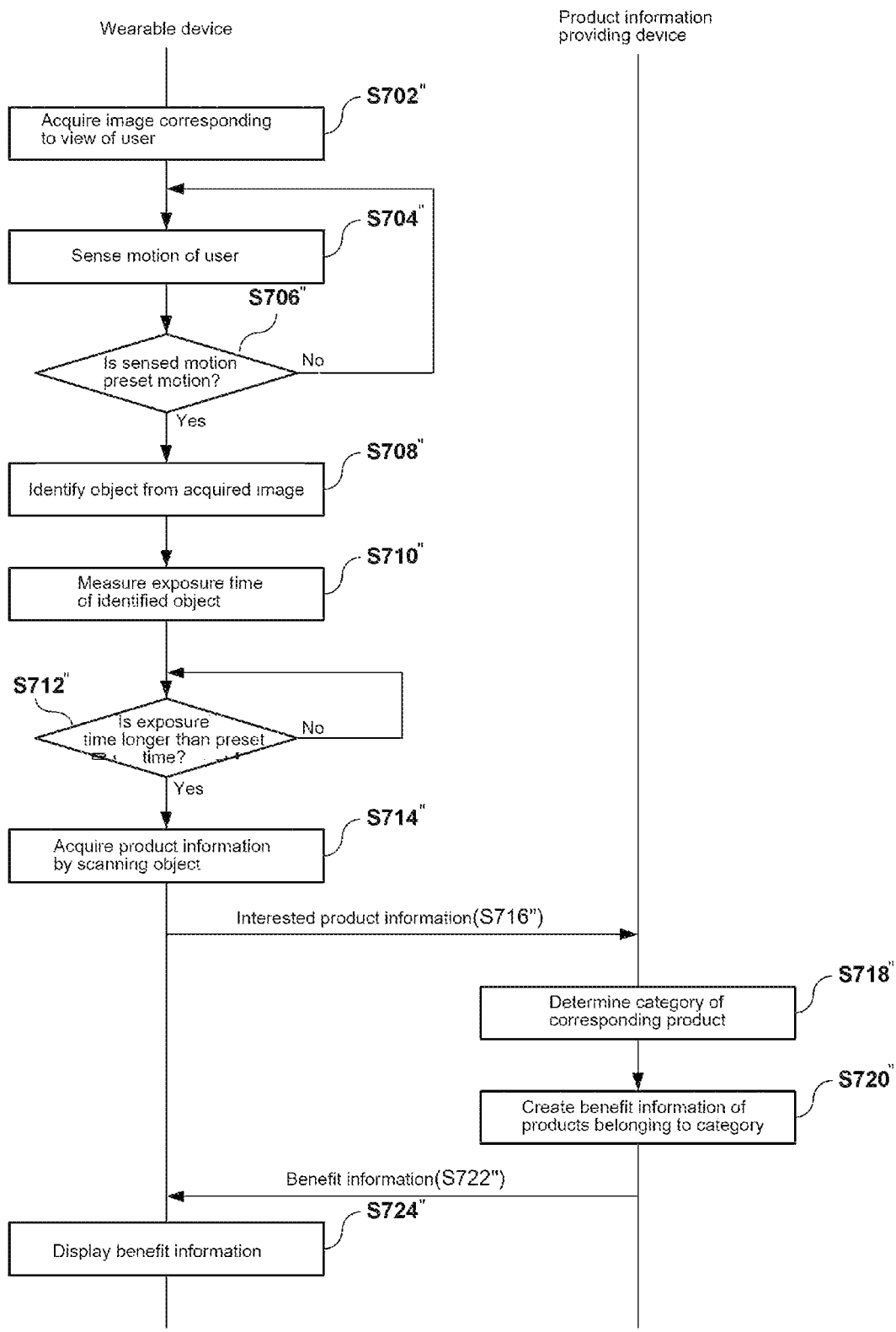
FIG. 25 is a flowchart illustrating a method of providing benefit information for an interested product according to an embodiment of the present invention.

FIG. 25 is a flowchart illustrating a method of providing benefit information for an interested product according to an embodiment of the present invention.

Referring to FIG. 25, a wearable device acquires an image corresponding to a view of a user and displays the image on a screen (step S702), senses a motion of the user (step S704) and determines whether or not the sensed motion of the user is a preset motion (step S706). Here, the preset motion may be, for example, a motion of picking up an object by the user.

If the sensed motion of the user is a preset motion as a result of the determination at step S706, the wearable device identifies an object from the displayed image (step S708). At this point, the wearable device may identify the object by using a method using a difference image, a meanshift and application method, a local binary pattern method or the like.

Then, the wearable device measures an exposure time of the identified object (step S710), and if the measured exposure time is longer than a preset time (step S712), the wearable device extracts product identification information by scanning the object (step S714). At this point, the wearable device may extract product identification information by using a variety of image analysis logic such as an Optical Character Reader (OCR) technique or the like, and the product identification information is a medium containing information which can specify the product and includes a product name printed on the wrap of the product, an image of the product or a product package, a Quick Response (QR) code, a bar code, a logo, a label, a brand, a manufacturer, a type and the like. The wearable device may store the extracted product identification information, the exposure time, the object image and the like.

Then, the wearable device transmits interested product information including the exposure time and the product identification information to the product information providing device (step S716).

The product information providing device extracts the product identification information from the interested product information and determines a category where a product corresponding to the extracted product identification information belongs to (step S718). At this point, the product information providing device may determine a brand or a type of a corresponding product, a preferred brand of a corresponding product and the like as the category of the product.

Then, the product information providing device creates benefit information of the products belonging to the determined category (step S720) and transmits the created benefit information to the wearable device (step S722). That is, the product information providing device confirms products for which benefits such as a coupon, a discount, a membership and the like are provided among the products belonging to the determined category and provides the wearable device with benefit information of the products in the form of a push message.

Then, the wearable device displays the benefit information received from the product information providing device (step S724).

Figure 26:
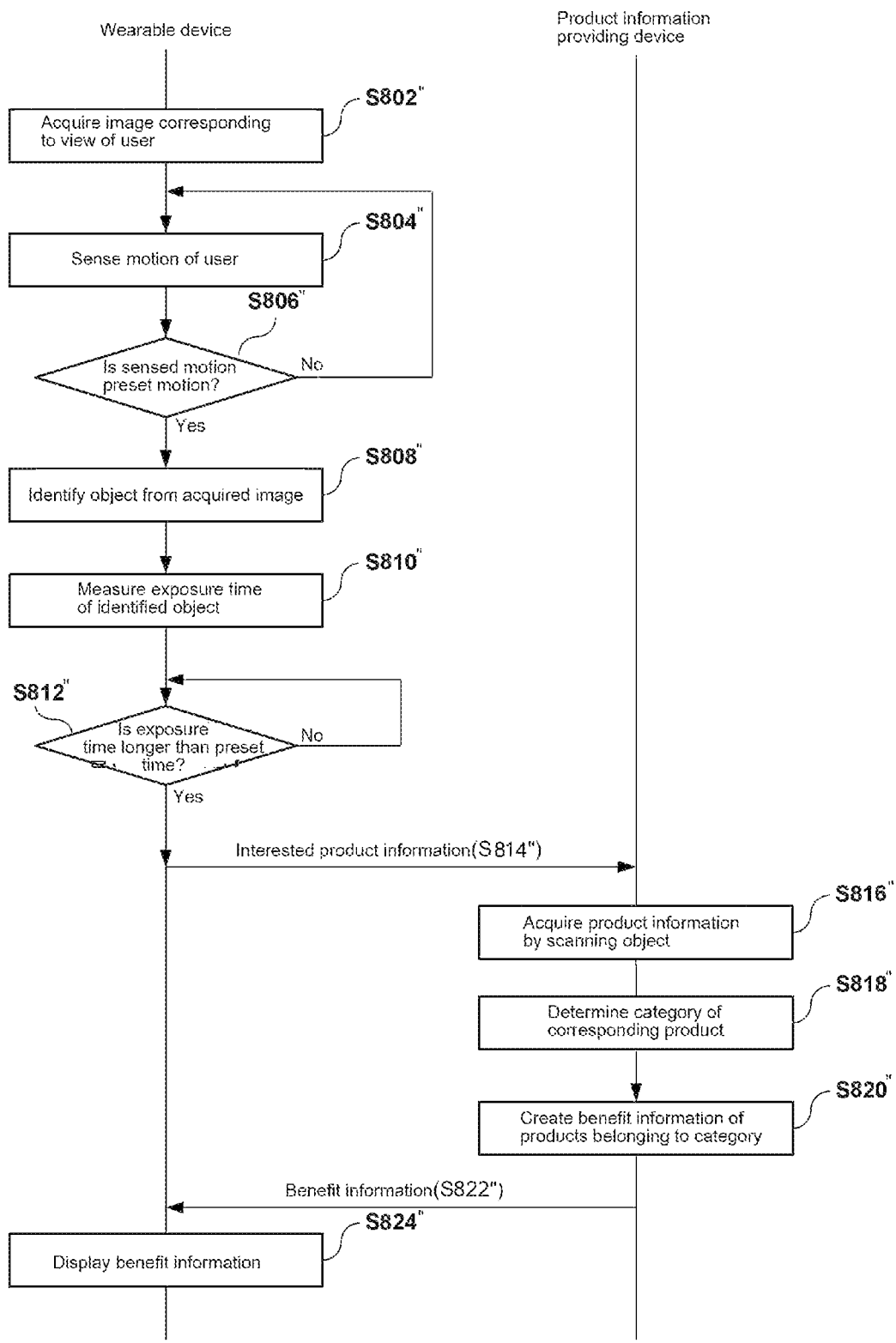
FIG. 26 is a flowchart illustrating a method of providing benefit information for an interested product according to another embodiment of the present invention.

FIG. 26 is a flowchart illustrating a method of providing benefit information for an interested product according to another embodiment of the present invention.

Referring to FIG. 26, a wearable device acquires an image corresponding to a view of a user and displays the image on a screen (step S802), senses a motion of the user (step S804) and determines whether or not the sensed motion of the user is a preset motion (step S806). Here, the preset motion may be, for example, a motion of picking up an object by the user.

If the sensed motion of the user is a preset motion as a result of the determination at step S806, the wearable device identifies an object from the displayed image (step S808).

Then, the wearable device measures an exposure time of the identified object (step S810), and if the measured exposure time is longer than a preset time (step S812), the wearable device transmits interested product information including the exposure time and the acquired image to the product information providing device (step S814).

The product information providing device acquires product identification information by scanning the received image (step S816) and determines a category where a product corresponding to the acquired product identification information belongs to (step S818). At this point, the product information providing device determines a brand or a type of a corresponding product, a preferred brand of a corresponding product and the like as the category of the product.

Then, the product information providing device creates benefit information of the products belonging to the determined category (step S820) and transmits the created benefit information to the wearable device (step S822). At this point, the product information providing device may transmit the benefit information in the form of a push message.

Then, the wearable device displays the benefit information received from the product information providing device (step S824).

The method of providing benefit information for an interested product according to another embodiment of the present invention may be mounted as a function basically provided by a wearable device, more specifically, a smart glass. In addition, the method of providing benefit information for an interested product according to another embodiment of the present invention may be implemented in the form of a program and, in this state, stored in a computer-readable recording medium, in which programs to be executed in a computer are recorded, or distributed through a program providing server.

Like this, those skilled in the art may recognize that the present invention can be embodied in other specific forms without departing from the spirit and essential characteristics of the present invention. Therefore, it should be understood that the embodiments described above are illustrative and not restrictive to limit the scope. In addition, the flowcharts in the figures show sequential orders exemplarily shown to achieve the most desirable results in implementing the present invention, and it is apparent that other additional steps can be provided or some steps can be deleted.

Technical features described in this specification and implementations executing the features can be implemented in digital electronic circuitry, or in computer software, firmware or hardware including the structures disclosed in this specification and their structural equivalents, or in combinations of one or more of them. In addition, the implementations executing the features described in this specification can be implemented as one or more computer program products, i.e., one or more modules of computer program instructions encoded on a tangible program carrier for execution by, or to control the operation of, a data processing device.

A computer-readable medium can be a machine-readable storage device, a machine-readable storage substrate, a memory device, a composition of matter effecting a machine-readable propagated signal, or any combination thereof.

The term "device" or "system" in the specification encompasses all instruments, devices and machines for processing data, including a processor, a computer or multiple processors or computers. The processing system may include, in addition to hardware, a code that creates an execution environment for the computer program if requested, e.g., a code constituting processor firmware, a protocol stack, a database management system, an operating system, or any combination thereof.

A computer program also referred to as a program, software, a software application, a script or a code can be written in any form of programming language including compiled or interpreted languages, or declarative or procedural languages, and can be implemented in any form including as a standalone program or a module, a component, a subroutine or other units suitable for use in a computing environment.

Meanwhile, a computer program does not necessarily correspond to a file in a file system. A program can be stored in a single file or multiple coordinated files (e.g., files that store one or more modules, sub-programs, or portions of a code) provided in the requested program or in a portion of a file that holds other programs or data (e.g., one or more scripts stored in a markup language document).

A computer program can be implemented to be executed on multiple computers or one or more computers located at one site or distributed across multiple sites and interconnected by a wired/wireless communication network.

Meanwhile, the computer-readable media suitable for storing computer programs, instructions and data may include all forms of non-volatile memory, media and memory devices including by way of example semiconductor memory devices, e.g., EPROM, EEPROM, and flash memory devices; magnetic disks, e.g., internal hard disks or external disks; magneto-optical disks; and CD and DVD disks. Further, the processor and memory can be supplemented by, or incorporated in, special purpose logic circuitry.

The implementations executing the features described in this specification can be implemented in a computing system that includes a back end component, e.g., a data server, or that includes a middleware component, e.g., an application server, or that includes a front end component, e.g., a client computer having a Web browser or a graphical user interface through which a user can interact with an implementation of the subject matter described in this specification, or any combination of one or more of the back end, middleware or front end components. The components of the system can be interconnected by any form or medium of digital data communication, e.g., a communication network.

Hereinafter, a further specific embodiment for implementing configurations including the system described in this specification together with the above-described contents and an MO (mobile originated) service-based benefic providing method will be described in detail.

The system and the service providing method using a payment information providing system described in this specification may be partially or entirely used through a means executing computer software, program codes or instructions on a server related to a client device or a web-based storage system or one or more processors included in the server.

Here, the processor may be part of a computing platform such as a server, a client, a network infrastructure, a mobile computing platform, a fixed computing platform or the like, and specifically, it can be a kind of a computer or a processing device which can execute program instructions, codes or the like.

In addition, the processor may further include memory for storing the service providing method using a payment information providing system, instructions, codes and programs, and if the memory is not included, the processor may access, through a separate interface, a storage device such as a CD-ROM, a DVD, memory, a hard disk, a flash drive, RAM, ROM cache or the like in which the service providing method using a payment information providing system, instructions, codes and programs are stored.

In addition, the system and the service providing method using a payment information providing system described in this specification may be partially or entirely used through a machine that executes computer software on a server, a client, a gateway, a hub, a router or network hardware.

Here, the software may be executed in various kinds of servers such as a file server, a print server, a domain server, an Internet server, an Intranet server, a host server, a distributed server and the like, and the servers may further include memories, processors, computer-readable storage media, storage media, communication devices, ports, clients and interfaces capable of accessing other servers through a wired/wireless network.

The service providing method using a payment information providing system, instructions, codes and the like also can be executed by a server, and other devices required for execution of the service providing method using a payment information providing system can be implemented as a part of a hierarchical structure associated with the server.

In addition, the server may provide an interface to other devices including, without limitation, clients, other servers, printers, database servers, print servers, file servers, communication servers, distributed servers and the like, and a connection through the interface may facilitate remote execution of a program through a wired/wireless network.

In addition, any one of the devices attached to the server through an interface may further include at least one storage device capable of storing the service providing method using a payment information providing system, instructions, codes and the like, and the central processor of the server may provide the device with instructions, codes and the like to be executed on different devices to be stored in the storage device.

On the other hand, the system and the service providing method using a payment information providing system described in this specification may be partially or entirely used through a network infrastructure.

Here, the network infrastructure may include all of devices such as computing devices, servers, routers, hubs, firewalls, clients, personal computers, communication devices, routing devices and the like, separate modules capable of executing each of the functions and the like and may further include a storage medium such as flash memory, a buffer, a stack, RAM, ROM and the like in addition to the devices and modules mention above. In addition, the service providing method using a payment information providing system, instructions, codes and the like also can be executed and stored by any one of the devices, modules and storage media included in the network infrastructure, and other devices needed to execute the service providing method using a payment information providing system also can be implemented as a part of the network infrastructure.

In addition, the system and the service providing method using a payment information providing system described in this specification may be implemented in hardware or a combination of hardware and software suitable for a particular application.

Here, the hardware may include all of general purpose computer devices such as a personal computer, a mobile communication device and the like and specific computer devices for enterprise, and the computer device may be implemented as a device including memory, microprocessors, microcontrollers, digital signal processors, application integrated circuits, programmable gate arrays, programmable array logic and the like or a combination thereof.

The computer software, instructions, program codes and the like described above may be stored or accessed by a readable device. Here, the readable device may include memory such as: computer components that retains digital data used for computing for some interval of time; semiconductor storage such as RAM or ROM; permanent storage such as optical disks; mass storage such as hard disks, tapes, drums or the like; optical storage such as CD or DVD; computer-detachable mass storage such as flash memory, floppy disks, magnetic tapes, paper tapes, standalone RAM disks or the like; network connection storage such as dynamic memory, static memory, variable storage or clouds, and the like.

Meanwhile, although the instructions, codes or the like include all the languages including data-oriented languages (e.g., SQL, dBase), system languages (e.g., C, Objective-C, C++, Assembly), architectural languages (e.g., Java, .NET), and application languages (e.g., PHP, Ruby, Perl, Python), they are not limited thereto and include all other languages known to those of skill in the art.

In addition, the term "computer-readable medium" described in this specification includes all the media contributing to providing instructions for execution of a program to a processor. Specifically, the medium includes, but not limited to, non-volatile media such as data storage devices, optical disks, magnetic disks and the like, volatile media such as dynamic memory and the like, and transmission media such as coaxial cables, copper wires, fiber optics and the like for transmitting data.

Meanwhile, the elements executing the technical features of the present invention, which are included in the block diagrams and flowcharts shown in the drawings attached to this specification, imply logical boundaries between the elements.

However, according to software or hardware embodiments, since the depicted elements and the functions thereof may be executed in the form of a standalone software module, a monolithic software structure, a code, a service and a combination of these and stored in a medium executable in a computer provided with a processor capable of executing stored program codes, instructions and the like to implement their functions, all such implementations may be regarded as being included within the scope of the present invention.

Thus, while the attached drawings and descriptions thereof set forth technical features of the present invention, no particular arrangement of software for implementing these functional aspects should be inferred from these descriptions unless explicitly stated or otherwise clear from the context. That is, there may exist various embodiments described above, and since part of the embodiments can be modified while possessing technical features the same as those of the present invention, all the modifications should be regarded as being included within the scope of the present invention.

While operations are depicted in the drawings in a particular order, this is shown to achieve the most desirable results should not be construed as requiring that such operations should be performed in the particular order shown or in a sequential order or that all the illustrated operations should be performed. In certain circumstances, multitasking and parallel processing may be advantageous.

Moreover, separation of various system components in the embodiments described above should not be understood as requiring such separation in all embodiments, and it should be understood that the described program components and systems can generally be integrated together in a single software product or packaged into multiple software products.

As described above, this specification is not intended to limit the present invention by the proposed specific terms. Accordingly, although the present invention has been described in detail with reference to the embodiments described above, those skilled in the art may make alterations, changes and modifications on the embodiments without departing from the scope of the present invention.

The scope of the present invention is represented by the claims to be described below rather than the detailed description, and it is to be interpreted that the meaning and scope of the claims and all the changes or modified forms derived from the equivalents thereof come within the scope of the present invention.

According to the present invention, payment information of a product can be provided promptly and correctly in real-time by recognizing a product image and creating product information using a wearable device 100.

In addition, an advantageous effect in marketing can be obtained by providing a service associated with digital contents in real-time using the product information.

In addition, an advantageous effect in marketing can be obtained by providing a custom-tailored product to a user by inversely using the information collected using a wearable device and providing a digital contents service associated with the product.

In the present invention, information on coupons, points or events that can be used at a store where a user is going to make a payment can be received without a physical input by sensing a payment motion of the user.

In addition, the present invention increases convenience of a user by sensing a payment motion of a user without a special input and progressing a payment at a store.

In addition, a wearable device transmits a position of a user to a product information providing device, receives information on coupons, points or events of an affiliated store, and provides payment information reflecting the received information to a terminal of the store so that the user may make a payment.

According to the present invention, since information on a product reviewed by a user with interest, as well as a product actually purchased by the user, is collected and the product is registered as an interested product, a user may be provided with information on a product although the user does not purchase the product.

In addition, purchase of an interested product can be induced by recommending benefit information such as a discount, a coupon, membership or the like of the products belonging to a category of a product registered as an interested product.

In addition, in the present invention, although a wearable device is inside a building, information on a store can be confirmed correctly by a beacon, and thus information on a coupon, a discount or an event of a corresponding store can be provided from a product information providing device.

The effects of the present invention are not limited to the effects mentioned above, and various effects can be included within the scope clearly understood by those skilled in the art from the above descriptions.

What is claimed is:

1. A wearable device comprising:
   a camera module configured to selectively capture an image of a physical product for which product information is to be presented to a user;
   a display screen configured to display the image of the physical product to the user responsive to capturing the image;
   a ring for wearing on a finger of the user configured to sense a hand gesture of the user on the physical product subsequent to presenting the image to the user; and
   a control unit configured to process payment on the physical product responsive to at least sensing the hand gesture by the ring.

2. The device according to claim 1, wherein the ring comprises an electromyography sensor for sensing an electrical signal of a muscle changing according to the hand gesture.

3. The device according to claim 1, wherein the ring comprises an inertial sensor for sensing an acceleration of the ring changing according to the hand gesture of the user.

4. The device according to claim 1, further comprising a communication unit configured to transmit a request generated by the control unit to a computing device together with position information and receiving information on coupons, points or events of a store in which the physical product is located based on the position information from the computing device.

5. The device according to claim 4, wherein the communication unit is configured to:
   receive the position information of the store from a beacon,
   transmit the position information of the store received from the beacon to a product information providing device, and
   receive the information on coupons, points or events applicable to the physical product from the computing device.

6. The device according to claim 1, wherein the control unit is further configured to perform optical character reading on the captured image.

7. The device according to claim 1, further comprising a motion storage unit for storing one or more payment motions of the user including the hand gesture.

8. The device according to claim 1, wherein the camera module is configured to capture the image of the physical product detecting the user gazing at the physical product for a predetermined amount of time and sensing a motion of the user by the ring.

9. The device according to claim 8, wherein the sensed motion is picking up of the physical product.

10. The device according to claim 8, wherein the sensed motion is moving of an arm or a finger with the physical product.

\* \* \* \* \*